(12) United States Patent
Sugita

(10) Patent No.: US 9,110,278 B2
(45) Date of Patent: Aug. 18, 2015

(54) ZOOM LENS AND IMAGE PICKUP APPARATUS INCLUDING SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/071,092

(22) Filed: Nov. 4, 2013

(65) Prior Publication Data
US 2014/0125858 A1 May 8, 2014

(30) Foreign Application Priority Data

Nov. 6, 2012 (JP) ................................ 2012-244232

(51) Int. Cl.
| | | |
|---|---|---|
| *G02B 15/14* | (2006.01) | |
| *G02B 3/02* | (2006.01) | |
| *G02B 17/00* | (2006.01) | |
| *G02B 15/177* | (2006.01) | |
| *G02B 15/15* | (2006.01) | |
| *G02B 5/00* | (2006.01) | |
| *G02B 13/04* | (2006.01) | |
| *G02B 13/00* | (2006.01) | |
| *G02B 13/18* | (2006.01) | |

(52) U.S. Cl.
CPC .............. *G02B 15/177* (2013.01); *G02B 5/005* (2013.01); *G02B 13/002* (2013.01); *G02B 13/009* (2013.01); *G02B 13/0045* (2013.01); *G02B 13/04* (2013.01); *G02B 13/18* (2013.01); *G02B 15/15* (2013.01)

(58) Field of Classification Search
CPC ...... G02B 13/04; G02B 15/177; G02B 13/18; G02B 15/14; G02B 13/009; G02B 13/0045; G02B 13/002; G02B 5/005
USPC ......... 359/680, 689, 682–685, 716, 740, 749, 359/753
See application file for complete search history.

(56) References Cited

U.S. PATENT DOCUMENTS 7,755,843 B2 * 7/2010 Yamasaki ...................... 359/680
7,773,308 B2 * 8/2010 Muramatsu et al. .......... 359/680

(Continued)

FOREIGN PATENT DOCUMENTS

| JP | H11-119101 A | 4/1999 |
|---|---|---|
| JP | 2005-106878 A | 4/2005 |

(Continued)

*Primary Examiner* — Evelyn A Lester
(74) *Attorney, Agent, or Firm* — Carter, DeLuca, Farrell & Schmidt, LLP

(57) ABSTRACT

The zoom lens includes, in order from an object side to an image side, a first lens unit having a negative refractive power, and a rear lens group including one or more lens units and having as a whole a positive refractive power. The first and rear lens group are moved during zooming so that a distance therebetween decreases at a telephoto end as compared with at a wide-angle end. The first lens unit includes an image side aspheric lens having a negative aspheric amount and one or more object side aspheric lenses disposed on the object side further than the image side aspheric lens. A condition of $0.060 < \Sigma Aspi \times Ndi/BLD1 < 0.200$ is satisfied where Aspi represents an aspheric amount of an i-th object side aspheric lens, Ndi represents a refractive index of the i-th object side aspheric lens, BLD1 represents a length of the first lens unit.

13 Claims, 16 Drawing Sheets

(56) References Cited

U.S. PATENT DOCUMENTS

| | | | |
|---|---|---|---|
| 8,085,475 B2 * | 12/2011 | Miyazaki et al. | 359/680 |
| 8,223,439 B2 * | 7/2012 | Okumura | 359/682 |
| 2006/0050406 A1 * | 3/2006 | Ishii | 359/680 |
| 2007/0002459 A1 * | 1/2007 | Saori | 359/680 |
| 2009/0201590 A1 * | 8/2009 | Sugita | 359/680 |
| 2011/0109974 A1 | 5/2011 | Sato | |
| 2012/0019926 A1 * | 1/2012 | Yamagami | 359/680 |
| 2012/0044575 A1 * | 2/2012 | Saori | 359/680 |
| 2014/0168788 A1 * | 6/2014 | Saito et al. | 359/680 |

FOREIGN PATENT DOCUMENTS

| | | |
|---|---|---|
| JP | 2007-094176 A | 4/2007 |
| JP | 2008-046208 A | 2/2008 |
| JP | 2008-233284 A | 10/2008 |
| JP | 2008-249842 A | 10/2008 |
| JP | 2011-102871 A | 5/2011 |
| JP | 2012-008271 A | 1/2012 |
| WO | 2006/115107 A1 | 11/2006 |

* cited by examiner

ZOOM LENS AND IMAGE PICKUP APPARATUS INCLUDING SAME

BACKGROUND OF THE INVENTION

1. Field of the Invention

The present invention relates to a zoom lens suitable for an image capturing optical system of image pickup apparatuses such as digital still cameras, video cameras, TV cameras and monitoring cameras.

2. Description of the Related Art

As an image capturing optical system used for image pickup apparatuses, a zoom lens having a wide angle of view, small distortion and high resolution is required. As a zoom lens having a wide angle of view, a negative lead zoom lens is known in which a most-object side lens unit (first lens unit) has a negative refractive power.

In order to increase the angle of view of the negative lead zoom lens and improve the resolution thereof, it is necessary to, for example, increase the negative refractive power of the first lens unit. In this case, since a large barrel-shaped distortion is generated, a large-diameter aspheric lens is generally used as the first lens unit having the negative refractive power to correct the distortion while increasing the angle of view.

In order to suppress generation of distortion due to increase of the angle of view and thereby to achieve a good optical performance, it is important to appropriately set a lens configuration of each lens unit constituting the zoom lens, a refractive power of each lens unit, a zoom type and the like. For example, in order to suppress the generation of distortion by using an aspheric lens, it is important to appropriately set a position of an aspheric surface in an optical system, a lens surface shape to which the aspheric surface is applied, an aspheric amount and the like. When such settings are inappropriate, it is difficult to achieve a high optical performance while miniaturizing the entire zoom lens and increasing the angle of view.

Japanese Patent Laid-Open No. 2005-106878 discloses a wide view angle zoom lens including a first lens unit having a negative refractive power, a second lens unit having a positive refractive power, a third lens unit having a positive refractive power and a fourth lens unit having a negative refractive power, which has a total angle of view of 120° at a wide-angle end and a zoom ratio of approximately 2.

In this zoom lens, even though two aspheric lenses are used in the first lens unit having the negative refractive power, relatively large astigmatism and coma aberration are generated.

Japanese Patent Laid-Open No. 2008-046208 discloses a wide view angle zoom lens including a first lens unit having a negative refractive power, a second lens unit having a positive refractive power, a third lens unit having negative refractive power and a fourth lens unit having a positive refractive power, which has a total angle of view of 106° at a wide-angle end and a zoom ratio of approximately 2.1.

In the zoom lens, although two aspheric lenses are used in the first lens unit having the negative refractive power, distortion is not sufficiently corrected.

Japanese Patent Laid-Open No. 2008-233284 discloses a wide view angle zoom lens including a first lens unit having a negative refractive power and a second lens unit having a positive refractive power, which has a total angle of view of 113° at a wide-angle end and a zoom ratio of approximately 1.7.

In this zoom lens, although two aspheric lenses are used in the first lens unit having the negative refractive power, distortion is not sufficiently corrected, and the entire zoom lens is large in size relative to the total angle of view and the zoom ratio.

US2011/0109974 discloses a single focus lens having a total angle of view of approximately 127°.

SUMMARY OF THE INVENTION

The present invention provides a zoom lens having a wide angle of view achieving a high optical performance in its entire zoom range, and provides an image pickup apparatus including the zoom lens.

The present invention provides as one aspect thereof a zoom lens including in order from an object side to an image side: a first lens unit having a negative refractive power; and a rear lens group including one or more lens units and having as a whole a positive refractive power. The first and rear lens group are moved during zooming so that a distance between the first and rear lens group decreases at a telephoto end as compared with at a wide-angle end. The first lens unit includes an image side aspheric lens having a negative aspheric amount and one or more object side aspheric lenses disposed on the object side further than the image side aspheric lens. The following condition is satisfied:

$$0.060 < \Sigma Aspi \times Ndi/BLD1 < 0.200$$

where $Aspi$ represents an aspheric amount of an i-th object side aspheric lens counted from the object side among the one or more object side aspheric lenses, $Ndi$ represents a refractive index of a material of the i-th object side aspheric lens, $BLD1$ represents a length of the first lens unit from its most-object side lens surface to its most-image side lens surface, and $\Sigma$ represents summation.

The present invention provides as another aspect thereof an image pickup apparatus including the above zoom lens; and an image sensor to photoelectrically converts an optical image formed by the zoom lens.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

A zoom lens of each of the following embodiments includes, in order from an object side to an image side, a first lens unit having a negative refractive power, and a rear lens group including one or more lens units and having as a whole a positive refractive power. The first and rear lens group are moved during zooming so that a distance between the first and rear lens group decreases at a telephoto end as compared with at a wide-angle end.

Figure 1:
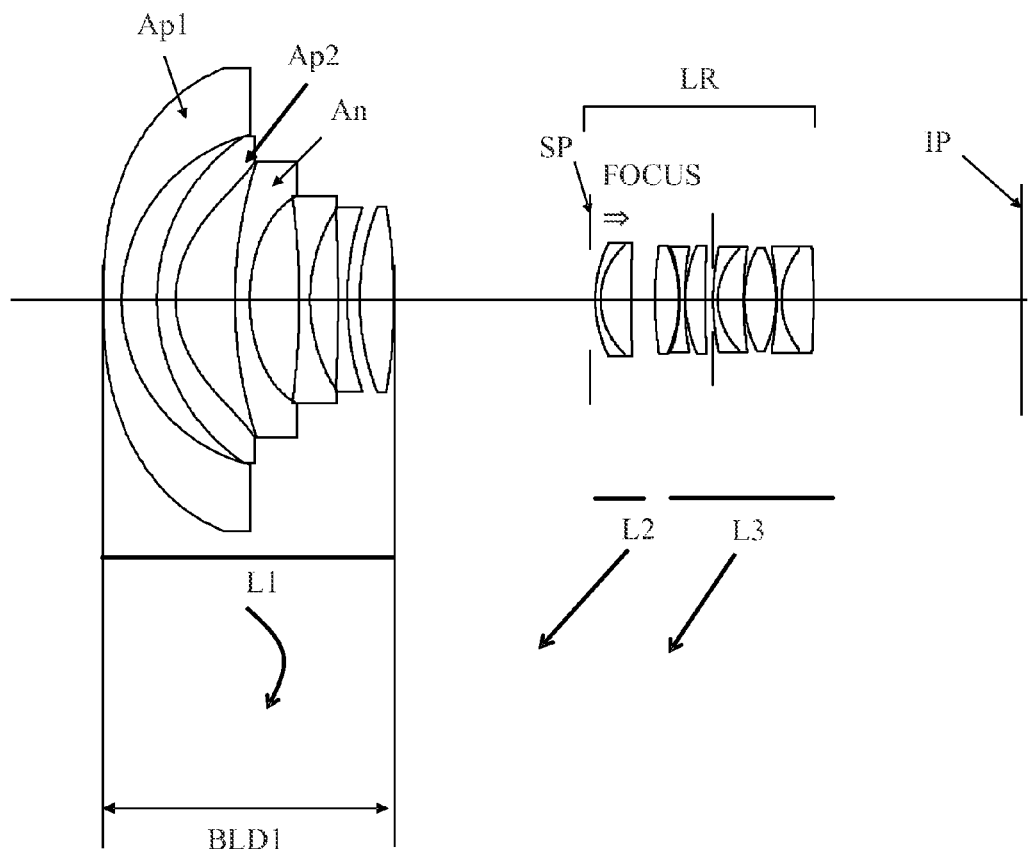
FIG. 1 is a sectional view of a zoom lens of Embodiment 1 in the present invention.
Figure 2A:
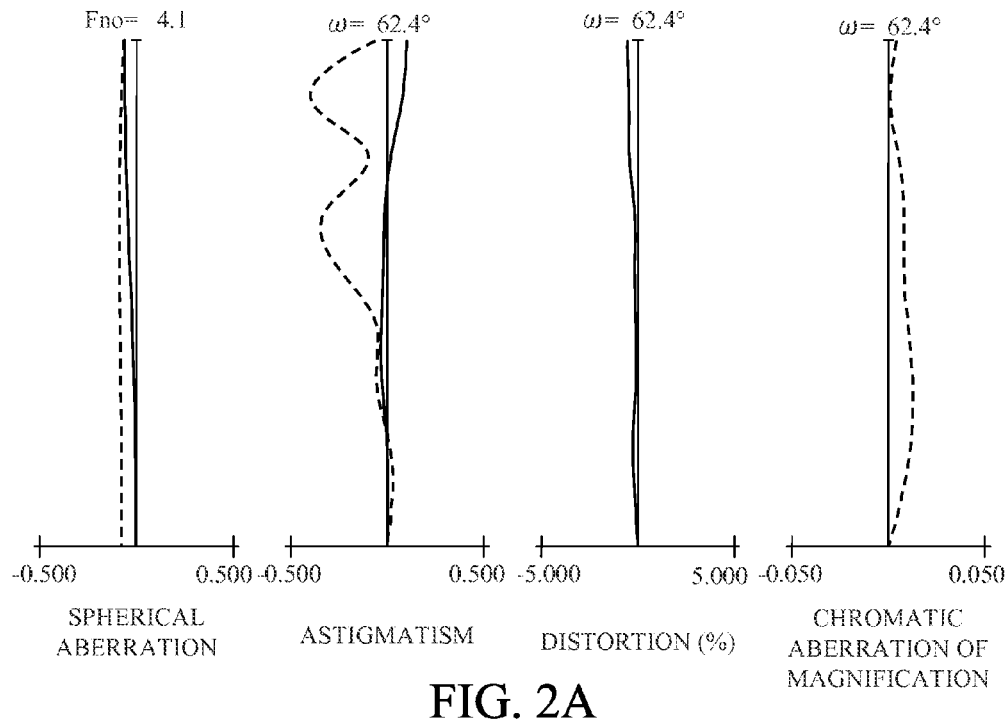
FIGS. 2A and 2B are aberration charts of the zoom lens of Embodiment 1 at a wide angle end and at a telephoto end when focusing on an infinite object.
Figure 2B:
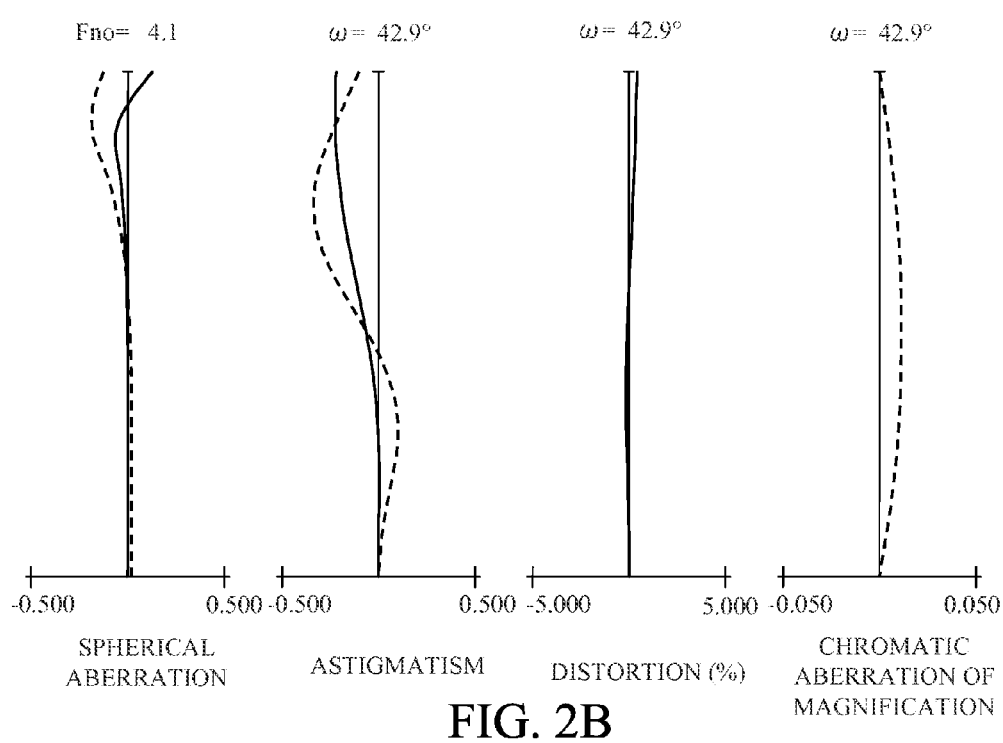
Figure 3:
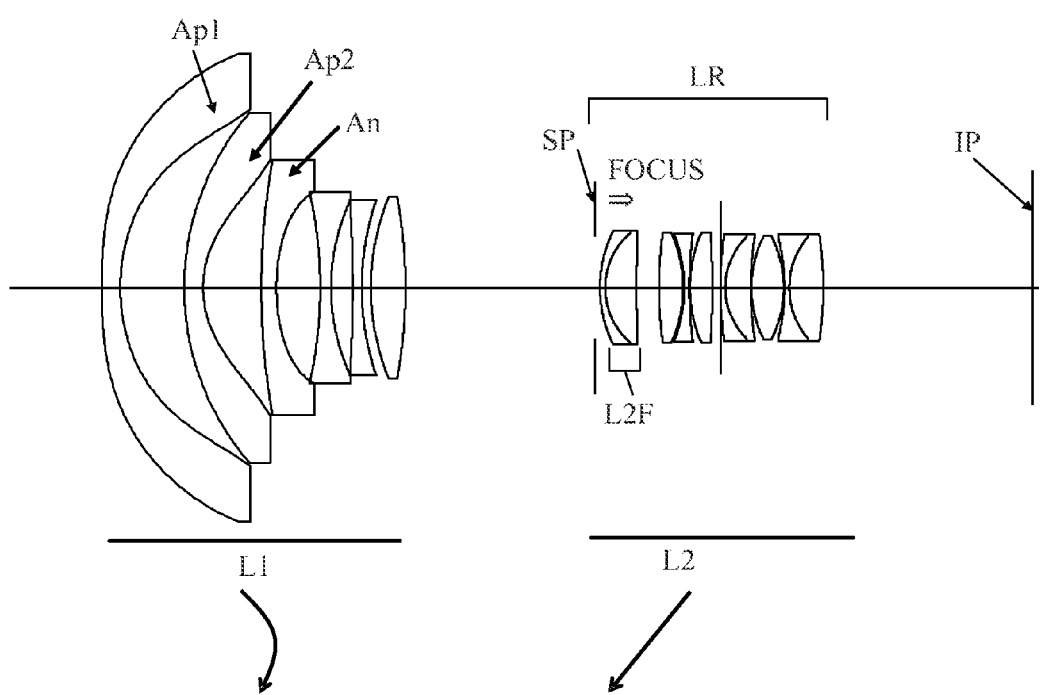
FIG. 3 is a sectional view of a zoom lens of Embodiment 2 in the present invention.
Figure 4A:
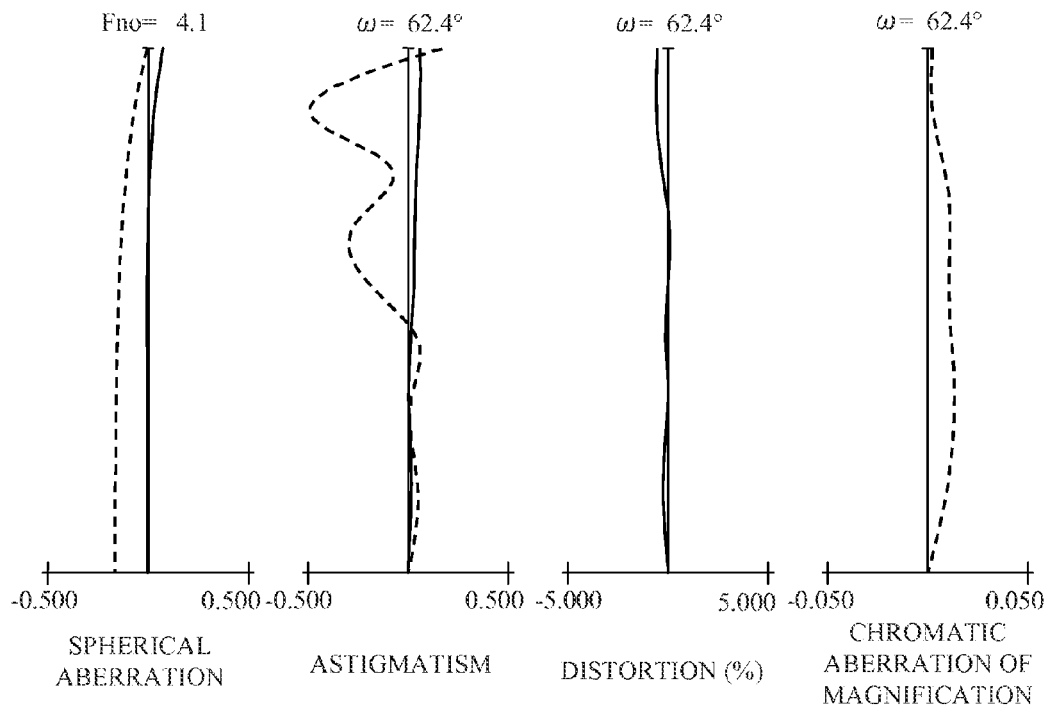
FIGS. 4A and 4B are aberration charts of the zoom lens of Embodiment 2 at a wide angle end and at a telephoto end when focusing on an infinite object.
Figure 4B:
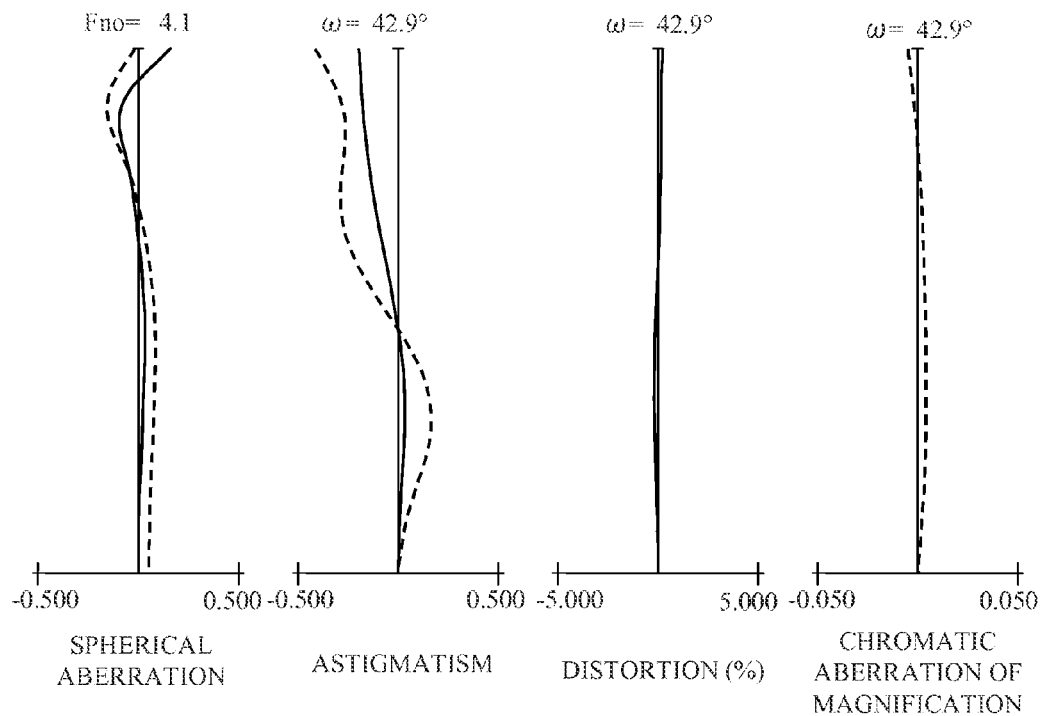

FIG. 1 shows a zoom lens of a first embodiment (Embodiment 1) of the present invention at a wide angle end (short side focal length end). FIGS. 2A and 2B are aberration charts of the zoom lens of Embodiment 1 at the wide angle end and at a telephoto end (long side focal length end). The zoom lens of Embodiment 1 has a zoom ratio of 2.06 and an aperture ratio of 4.10. FIG. 3 shows a zoom lens of a second embodiment (Embodiment 2) of the present invention at a wide angle end. FIGS. 4A and 4B are aberration charts of the zoom lens of Embodiment 2 at the wide angle end and at a telephoto end. The zoom lens of Embodiment 2 has a zoom ratio of 2.06 and an aperture ratio of 4.10.

Figure 5:
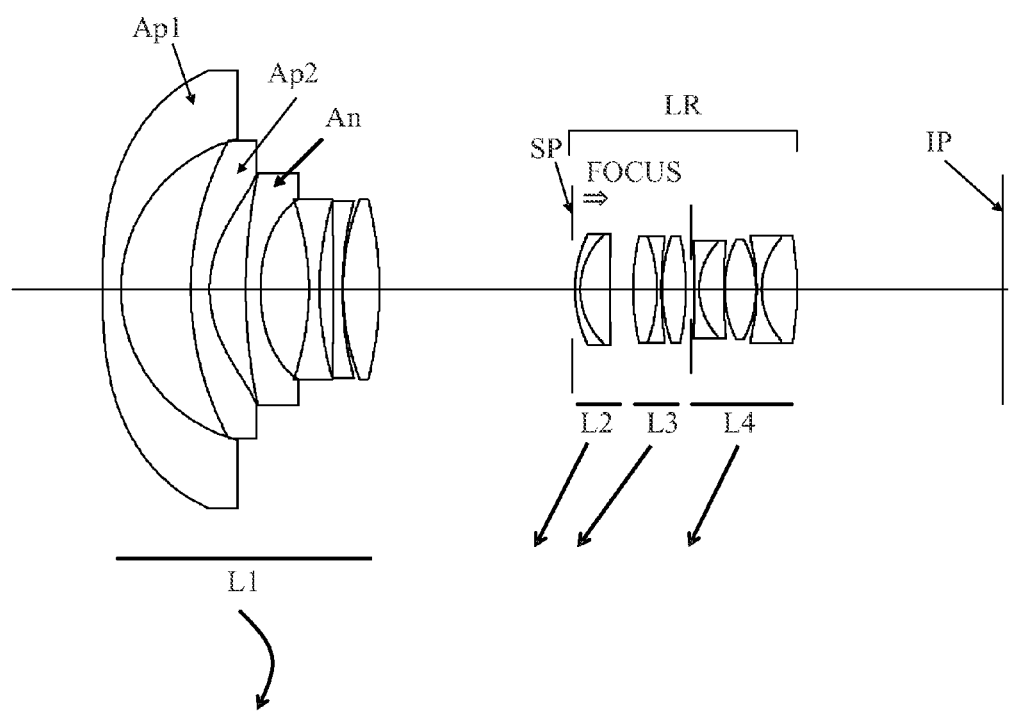
FIG. 5 is a sectional view of a zoom lens of Embodiment 3 in the present invention.
Figure 6A:
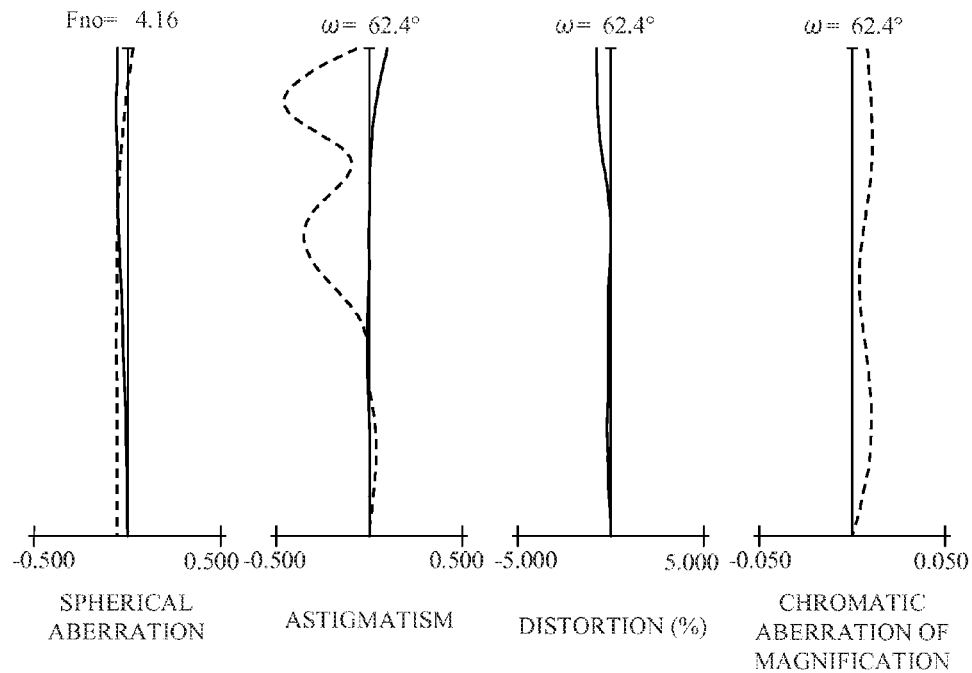
FIGS. 6A and 6B are aberration charts of the zoom lens of Embodiment 3 at a wide angle end and at a telephoto end when focusing on an infinite object.
Figure 6B:
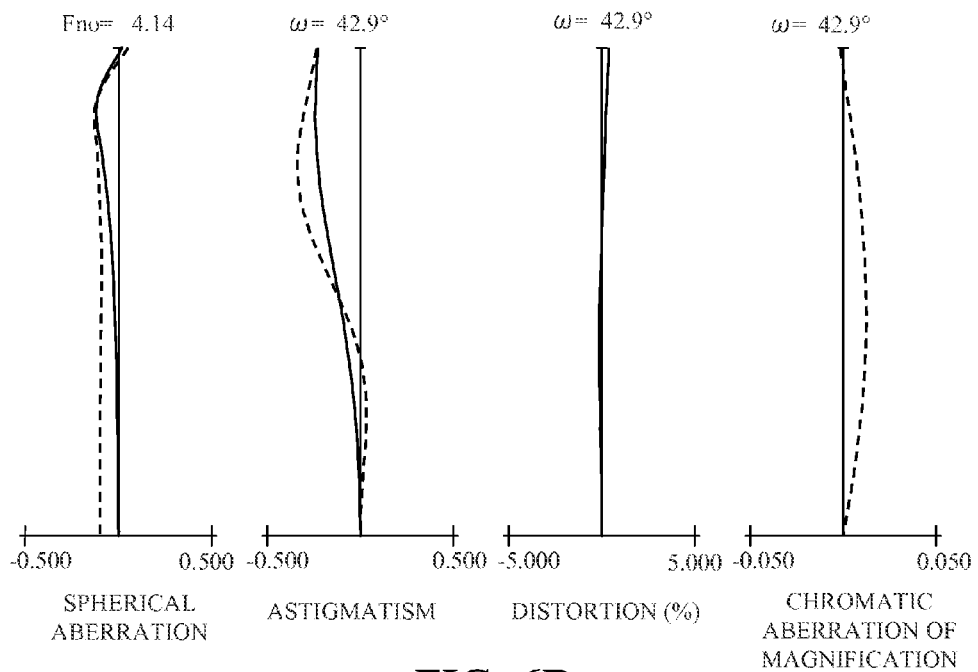
Figure 7:
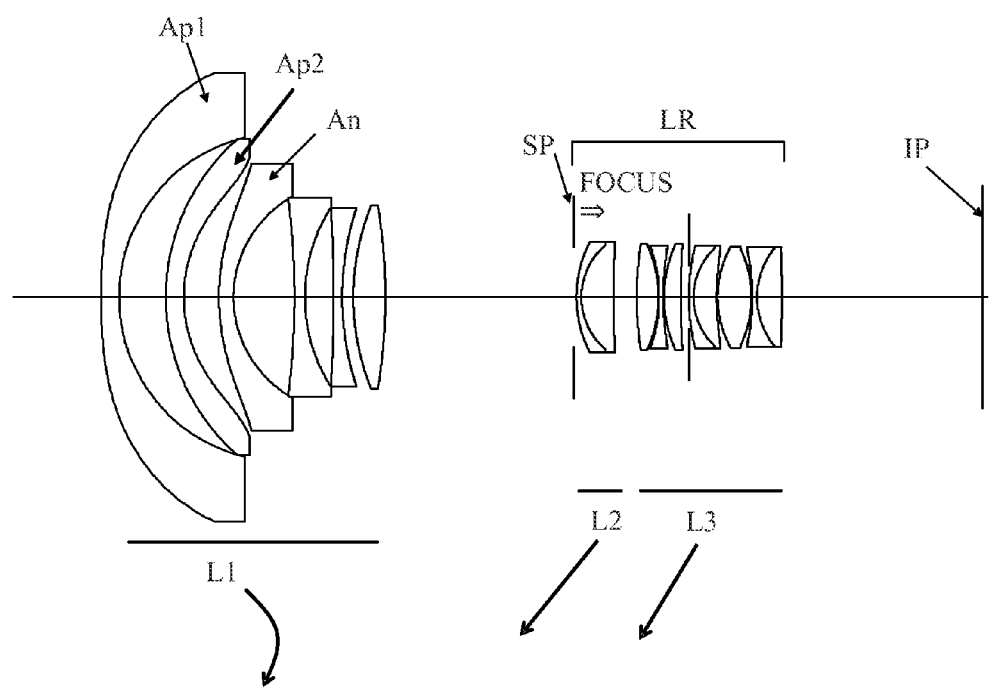
FIG. 7 is a sectional view of a zoom lens of Embodiment 4 in the present invention.
Figure 8A:
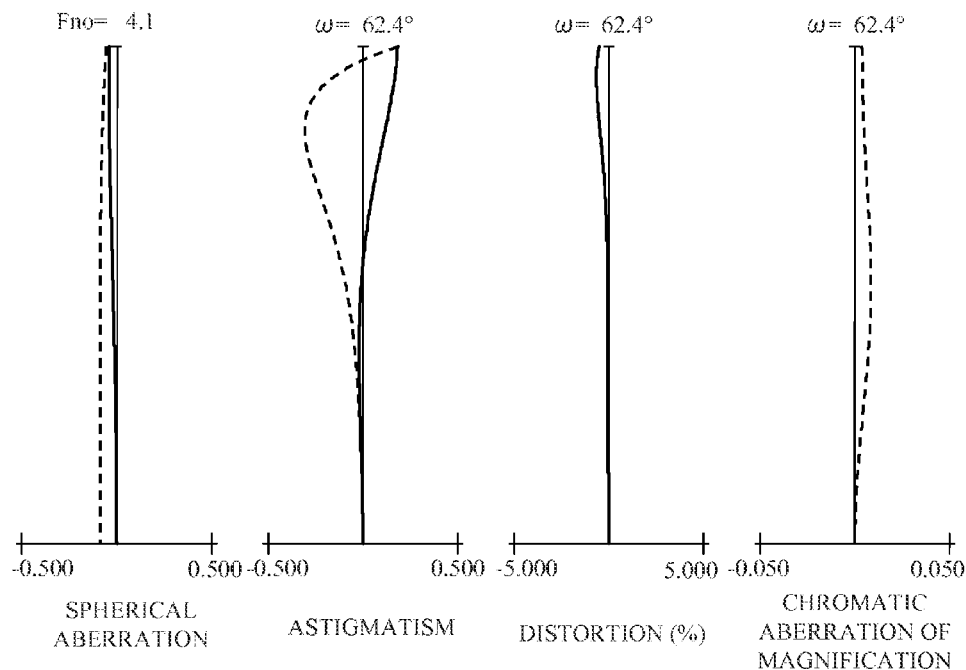
FIGS. 8A and 8B are aberration charts of the zoom lens of Embodiment 4 at a wide angle end and at a telephoto end when focusing on an infinite object.
Figure 8B:
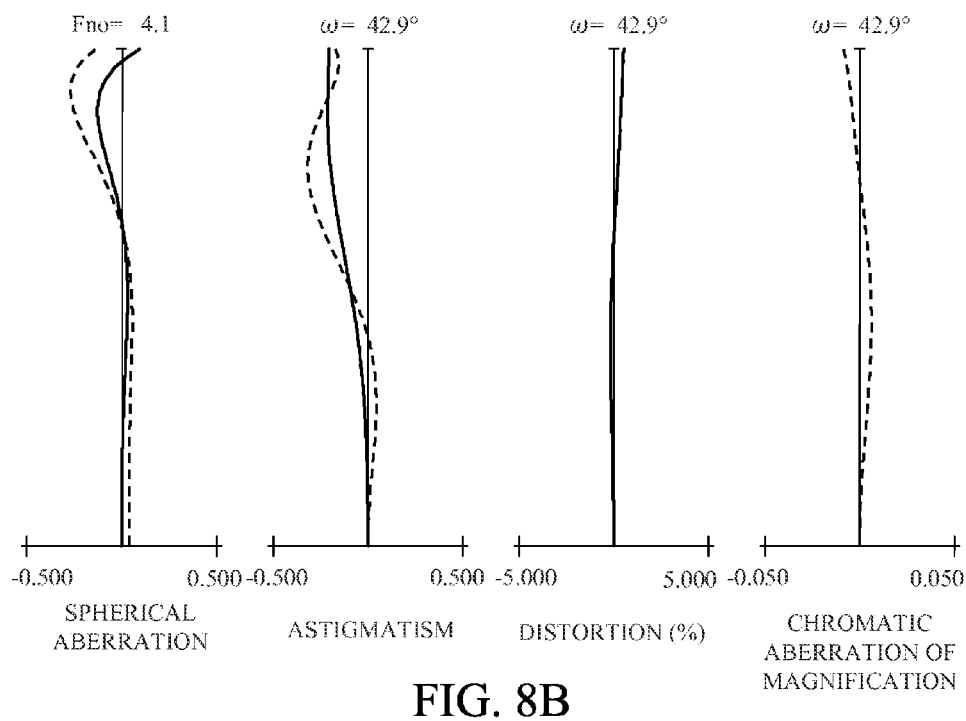

FIG. 5 shows a zoom lens of a third embodiment (Embodiment 3) of the present invention at a wide angle end. FIGS. 6A and 6B are aberration charts of the zoom lens of Embodiment 3 at the wide angle end and at a telephoto end. The zoom lens of Embodiment 3 has a zoom ratio of 2.06 and an aperture ratio of approximately 4.16-4.14. FIG. 7 shows a zoom lens of a fourth embodiment (Embodiment 4) of the present invention at a wide angle end. FIGS. 8A and 8B are aberration charts of the zoom lens of Embodiment 4 at the wide angle end and at a telephoto end. The zoom lens of Embodiment 4 has a zoom ratio of 2.06 and an aperture ratio of 4.10.

Figure 9:
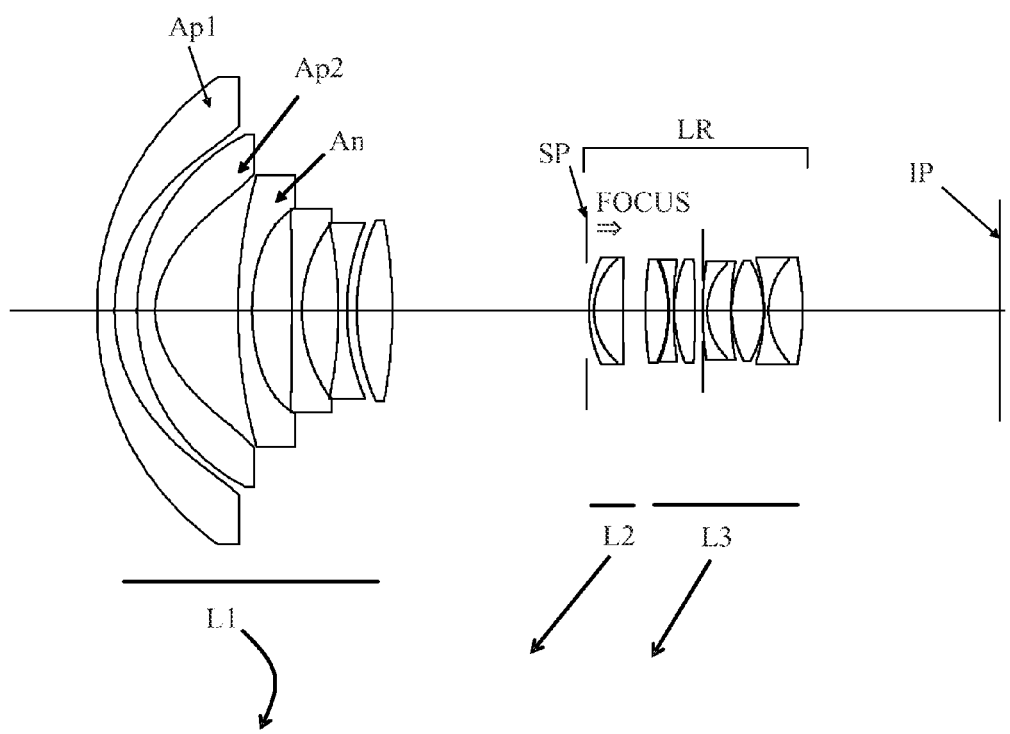
FIG. 9 is a sectional view of a zoom lens of Embodiment 5 in the present invention.
Figure 10A:
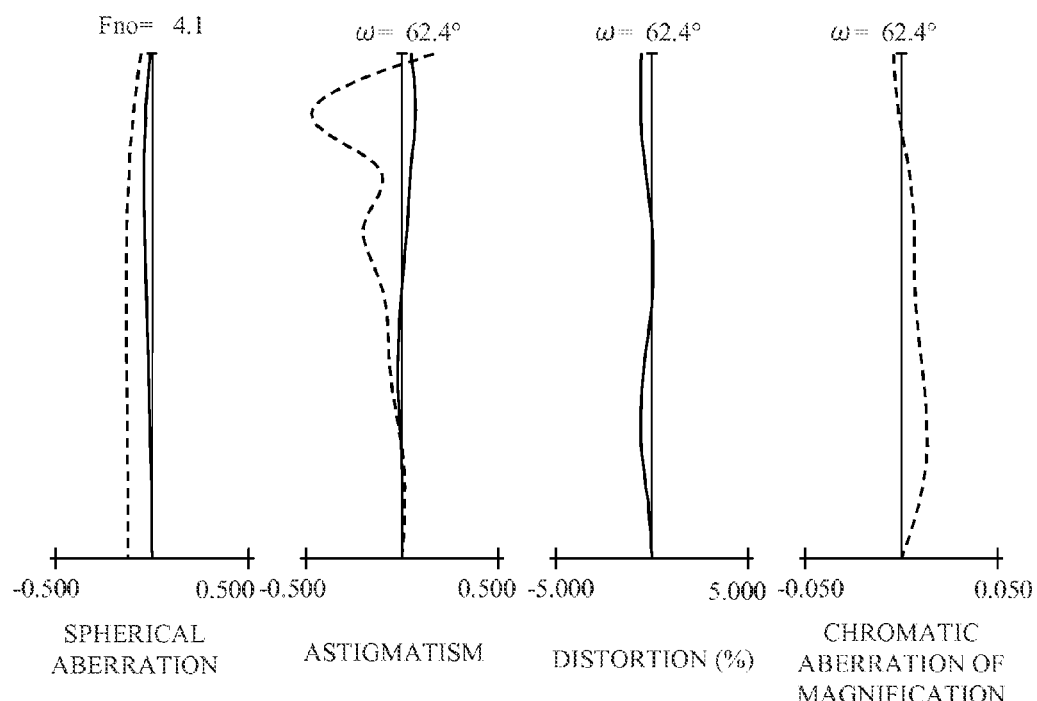
FIGS. 10A and 10B are aberration charts of the zoom lens of Embodiment 3 at a wide angle end and at a telephoto end when focusing on an infinite object.
Figure 10B:
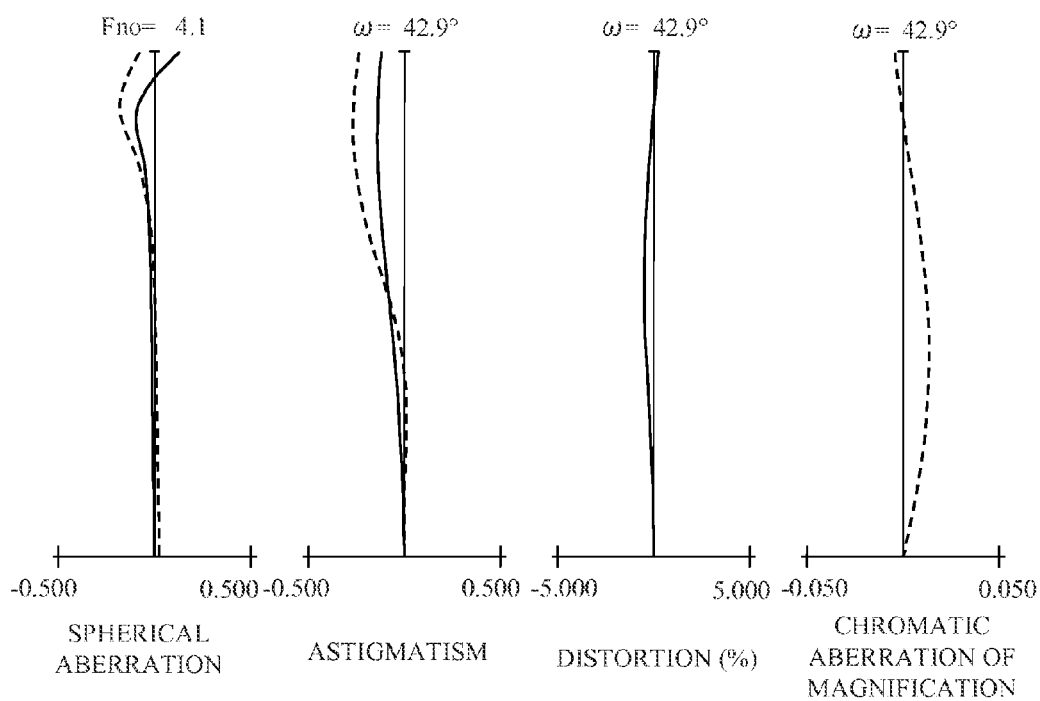
Figure 11:
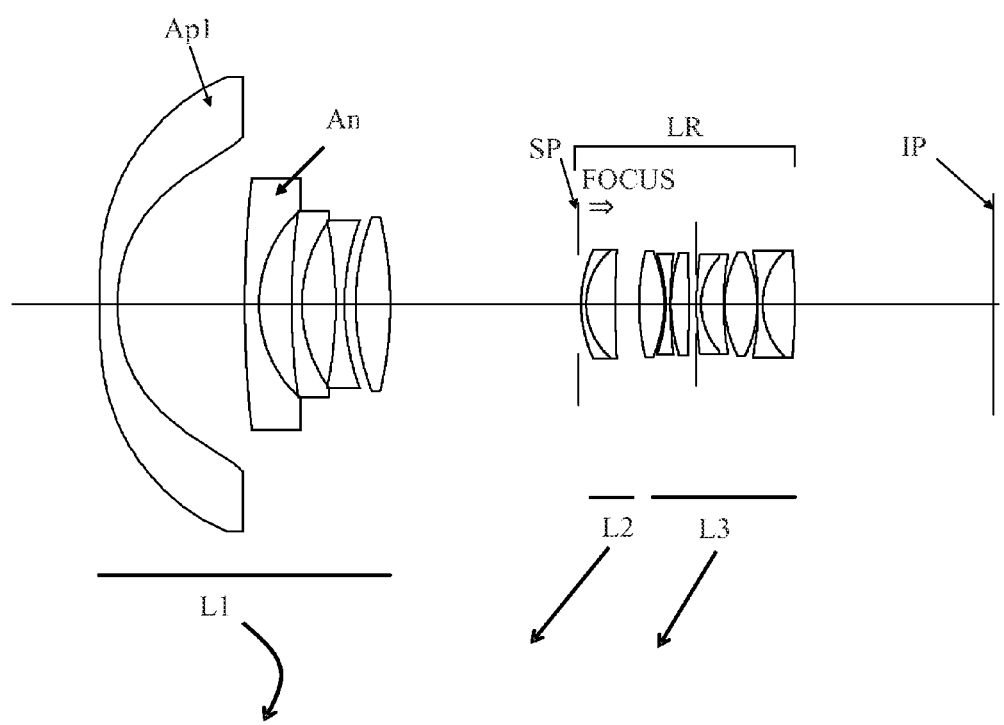
FIG. 11 is a sectional view of a zoom lens of Embodiment 6 in the present invention.
Figure 12A:
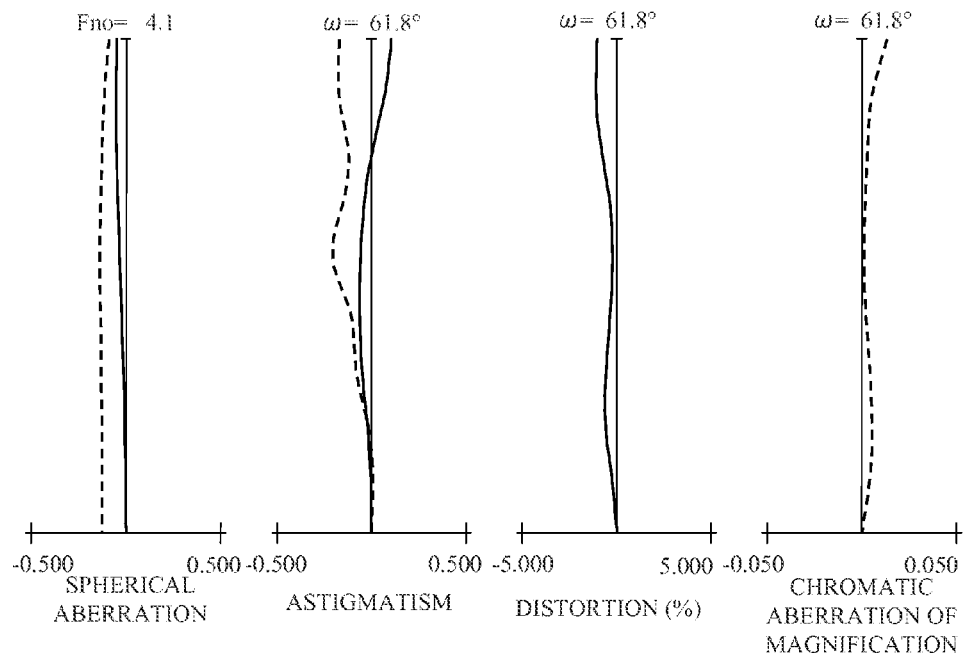
FIGS. 12A and 12B are aberration charts of the zoom lens of Embodiment 3 at a wide angle end and at a telephoto end when focusing on an infinite object.
Figure 12B:
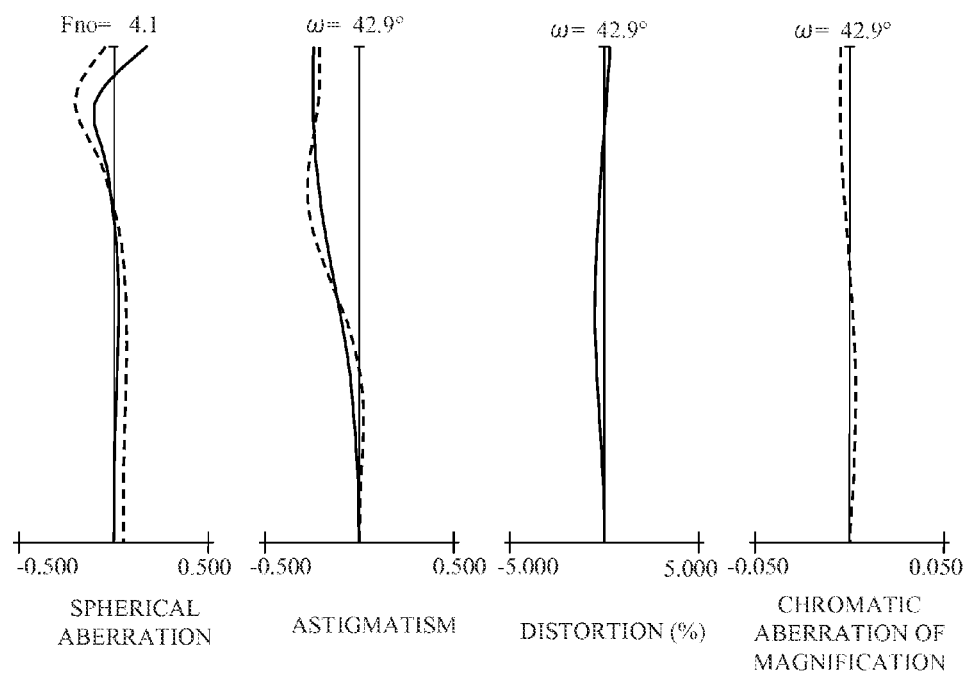

FIG. 9 shows a zoom lens of a fifth embodiment (Embodiment 5) of the present invention at a wide angle end. FIGS. 10A and 10B are aberration charts of the zoom lens of Embodiment 5 at the wide angle end and at a telephoto end. The zoom lens of Embodiment 5 has a zoom ratio of 2.06 and an aperture ratio of 4.10. FIG. 11 shows a zoom lens of a sixth embodiment (Embodiment 6) of the present invention at a wide angle end. FIGS. 12A and 12B are aberration charts of the zoom lens of Embodiment 6 at the wide angle end and at a telephoto end. The zoom lens of Embodiment 6 has a zoom ratio of 2.06 and an aperture ratio of 4.10.

Figure 13:
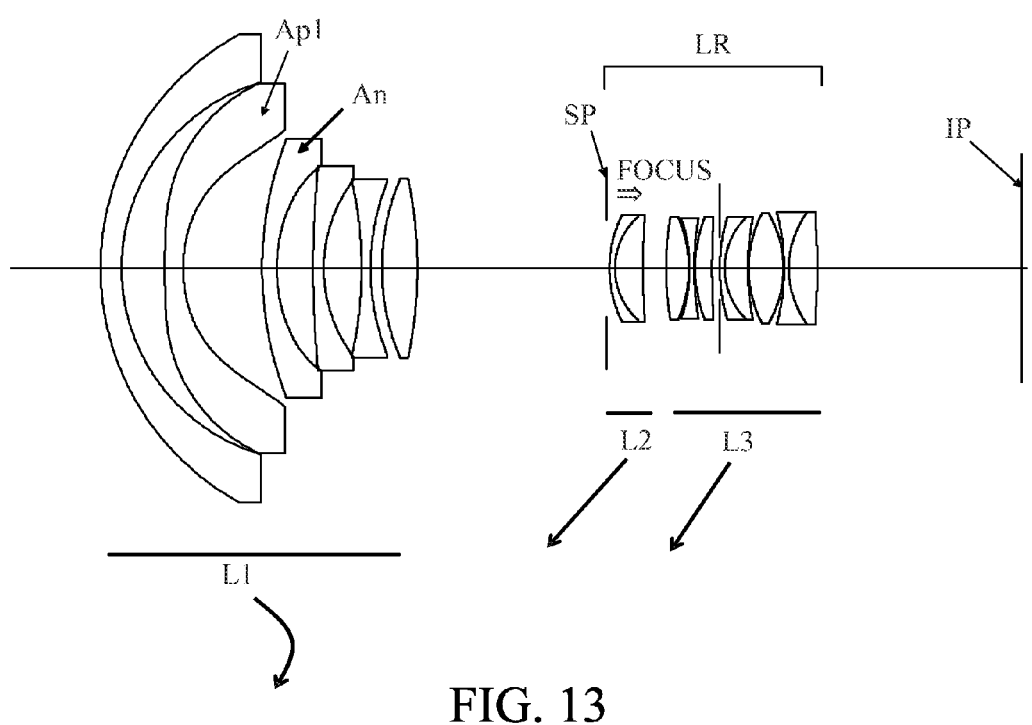
FIG. 13 is a sectional view of a zoom lens of Embodiment 7 in the present invention.
Figure 14A:
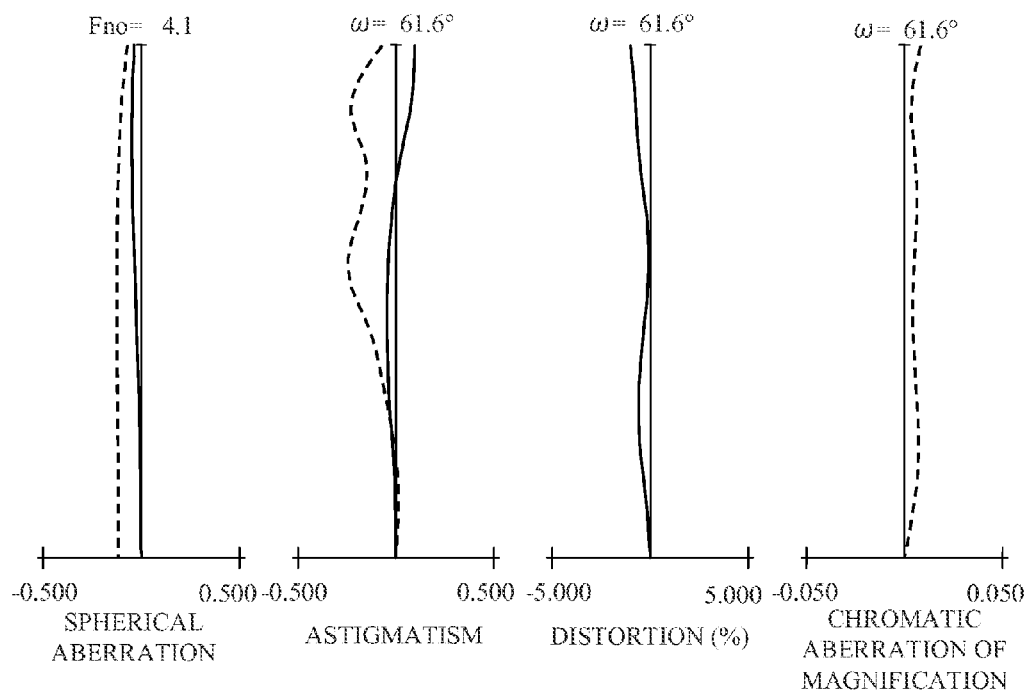
FIGS. 14A and 14B are aberration charts of the zoom lens of Embodiment 3 at a wide angle end and at a telephoto end when focusing on an infinite object.
Figure 14B:
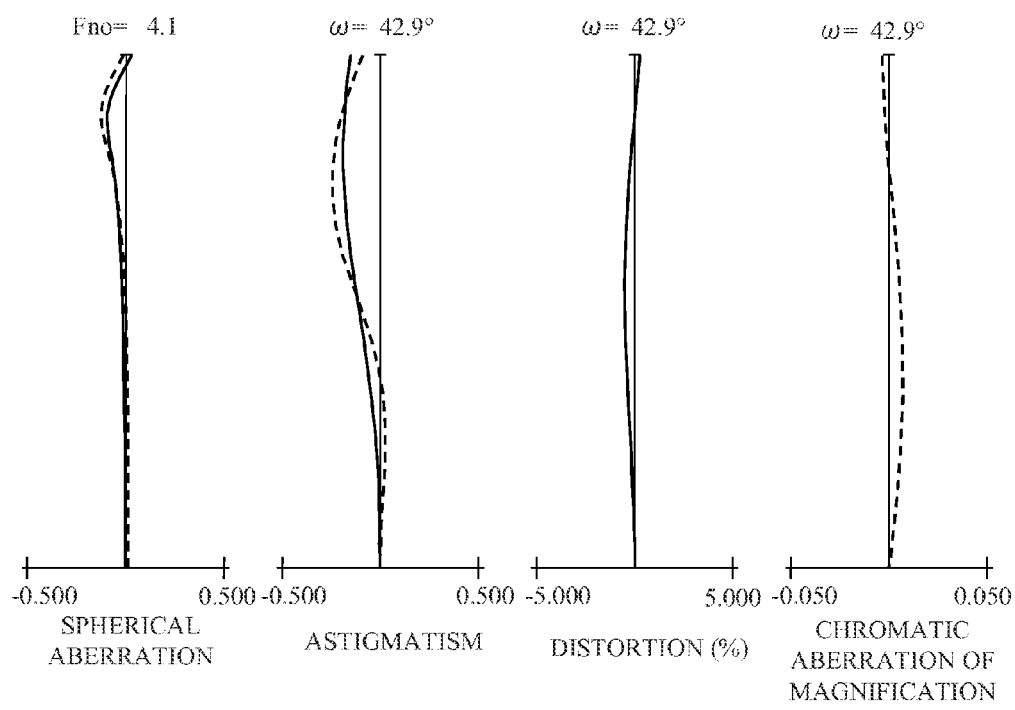
Figure 15:
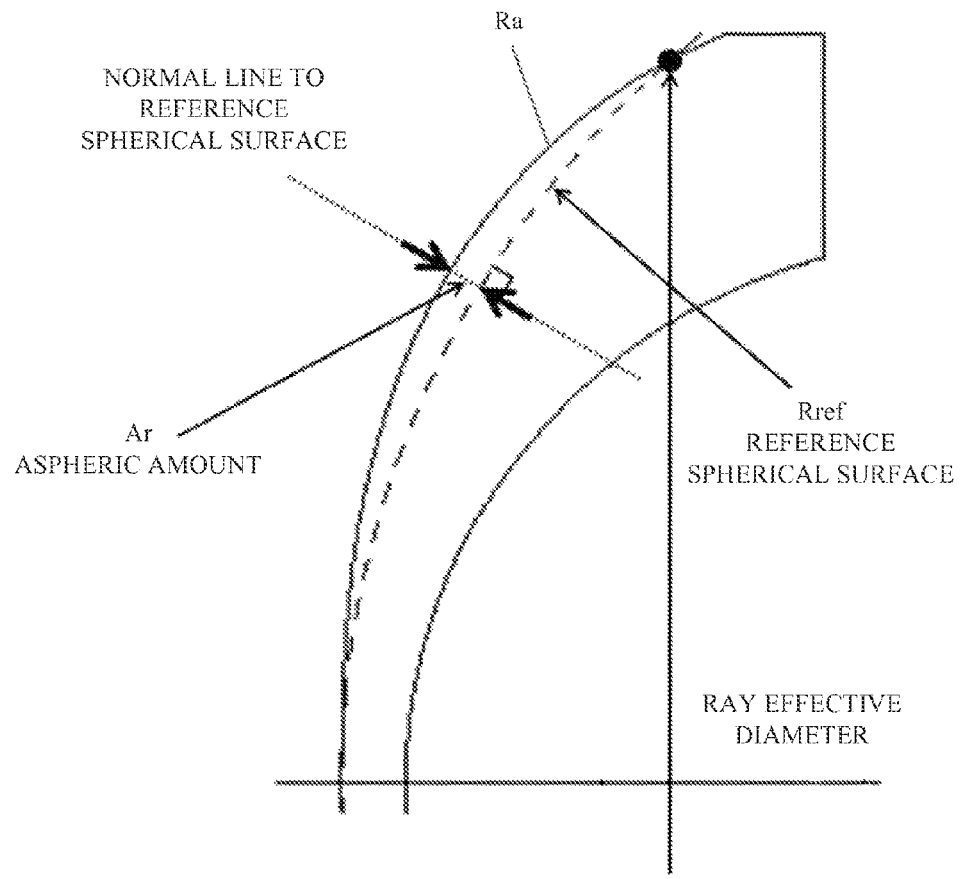
FIG. 15 shows a definition of an aspheric amount in the embodiments.

FIG. 13 shows a zoom lens of a seventh embodiment (Embodiment 7) of the present invention at a wide angle end. FIGS. 14A and 14B are aberration charts of the zoom lens of Embodiment 7 at the wide angle end and at a telephoto end. The zoom lens of Embodiment 7 has a zoom ratio of 1.99 and an aperture ratio of 4.10. FIG. 15 shows a definition of an aspheric amount in the embodiments. In FIGS. 1, 3, 5, 7, 9, 11 and 13, a left side corresponds to an object side (front side), and a right side corresponds to an image side (rear side).

Moreover, in FIGS. 1, 3, 5, 7, 9, 11 and 13, i represents an ordinal number of respective lens units counted from the object side to the image side, that is, Li denotes an i-th lens unit. LR denotes the rear lens group including one or more lens units and wholly having a positive refractive power. SP denotes an F-number determining member (hereinafter referred to as "an aperture stop") having a function of determining (limiting) a light amount corresponding to a fully-opened F-number (Fno). IP denotes an image plane at which, when the zoom lens is used as an image capturing optical system of a video camera or a digital still camera, an image pickup surface of a solid-state image sensor (photoelectric conversion element) such as a CCD sensor or a CMOS sensor is placed, and at which, when the zoom lens is used as an image capturing optical system of a silver-halide film camera, a photosensitive surface corresponding to a film surface is placed.

In the aberration chart of spherical aberration, a solid line shows spherical aberration for a d-line (wavelength=587.6 nm), and a dotted line shows spherical aberration for a g-line (wavelength=435.8 nm). In the aberration chart of astigmatism, a dotted line shows astigmatism in a meridional image plane, and a solid line shows astigmatism in a sagittal image plane. In the aberration chart of chromatic aberration of magnification, the aberration is shown by a difference of the g-line with respect to the d-line. Fno represents an F-number, and ω represent a half angle of view.

In the following each embodiment, the wide-angle end and the telephoto end correspond to zoom positions when a magnification varying lens unit is located at ends of its mechanically movable range on an optical axis of the zoom lens. In FIGS. 1, 3, 5, 7, 9, 11 and 13, arrows show movement loci of the respective lens units during zooming from the wide-angle end to the telephoto end.

In the zoom lenses of Embodiments 1 and 4 to 7 shown in FIGS. 1, 7, 9, 11 and 13, reference character L1 denotes the above-mentioned first lens unit having a negative refractive power (which is an optical power corresponding to an inverse of a focal length), reference character L2 denotes a second lens unit having a positive refractive power, reference character L3 denotes a third lens unit having a positive refractive power. In Embodiments 1 and 4 to 7, the above-mentioned rear lens group LR includes, in order from the object side to the image side, the second lens unit L2 having the positive refractive power and the third lens unit L3 having the positive refractive power.

In the zoom lenses of Embodiments 1 and 4 to 7, the second and third lens units L2 and L3 are moved to the object side during zooming from the wide-angle end to the telephoto end so that a distance therebetween increases. Specifically, during zooming from the wide-angle end to the telephoto end, the first lens unit L1 is approximately moved back and forth so as to draw a locus convex toward the image side to correct variation of the image plane IP caused by variation of magnification. The second lens unit L2 is monotonously moved to the object side.

Moreover, the third lens unit L3 is moved to the object side. Thus, the first, second and third lens units L1, L2 and L3 are moved during zooming so that a distance between the first and second lens units L1 and L2 decreases and the distance between the second and third lens units L2 and L3 increases at the telephoto end as compared with the wide-angle end. Furthermore, the second lens unit L2 is moved to the image side to perform focusing on from an infinite object to a close distance object. The aperture stop SP is disposed on the object side further than the second lens unit L2 and is moved together with the second lens unit L2 (that is, so as to draw a same locus as that of the second lens unit L2) during zooming.

In the zoom lens of Embodiment 2 shown in FIG. 3, reference character L1 denotes the above-mentioned first lens unit having a negative refractive power, and reference character L2 denotes a second lens unit having a positive refractive power. In Embodiment 2, the rear lens group LR is constituted by (consists of) the second lens unit L2 having the positive refractive power. In the zoom lens of Embodiment 2, during zooming from the wide-angle end to the telephoto end, the first lens unit L1 is appropriately moved back and forth so as to draw a locus convex toward the image side to correct variation of the image plane IP caused by variation of magnification. The second lens unit L2 is monotonously moved to the object side to mainly perform variation of magnification. During zooming, the first and second lens units L1 and L2 are moved so that a distance therebetween decreases at the telephoto end as compared with at the wide-angle end.

Moreover, a lens component L2F that is part of the second lens unit L2 is moved to the object side to perform focusing on from an infinite object to a close distance object. The aperture stop SP is disposed on the object side further than the second lens unit L2 and is moved together with the second lens unit L2 during zooming.

In the zoom lens of Embodiment 3 shown in FIG. 5, reference character L1 is the above-mentioned first lens unit having a negative refractive power, reference character L2 denotes a second lens unit having a positive refractive power, reference character L3 denotes a third lens unit having a positive refractive power and reference character L4 denotes a fourth lens unit having a negative refractive power. In Embodiment 3, the rear lens group LR includes, in order from the object side to the image side, the second lens unit L2 having a positive refractive power, the third lens unit L3 having a positive refractive power and the fourth lens unit L4 having a negative refractive power.

In the zoom lens of Embodiment 3, during zooming from the wide-angle end to the telephoto end, the first lens unit L1 is approximately moved back and forth so as to draw a locus convex toward the image side to correct variation of the image plane IP caused by variation of magnification. The second, third and fourth lens units L2, L3 and L4 are moved to the object side. Specifically, the first, second, third and fourth lens units L1, L2, L3 and L4 are moved so that a distance between the first and second lens units L1 and L2 decreases, a distance between the second and third lens units L2 and L3 decreases and a distance between the third and fourth lens units L3 and L4 increases at the telephoto end as compared with at the wide-angle end.

Moreover, the second lens unit L2 is moved to the image side to perform focusing on from an infinite object to a close distance object. The aperture stop SP is disposed on the object side further than the second lens unit L2 and is moved together with the second lens unit L2 during zooming.

Next, definition of an aspheric amount of an aspheric lens surface provided to an aspheric lens in the zoom lens of each embodiment will be described. As shown in FIG. 15, the aspheric amount Ar is a maximum value of a difference amount of an aspheric surface Ra from a reference spherical surface Rref. A radius (curvature radius) of the reference spherical surface Rref corresponds to a radius of a spherical surface determined by its surface apex and effective diameter.

When a direction in which the aspheric surface Ra differs from the reference spherical surface Rref is a direction in which a thickness of the aspheric lens is increased, the aspheric amount Ar in that direction is defined as a positive aspheric amount. When the direction in which the aspheric surface Ra differs from the reference spherical surface Rref is a direction in which the thickness of the aspheric lens is decreased, the aspheric amount Ar in that direction is defined as a negative aspheric amount. For example, the aspheric surface Ra is a positive aspheric amount. When object side and image side lens surfaces of an aspheric lens both have aspheric shapes, a sum of aspheric amounts of these lens surfaces is the aspheric amount of the aspheric lens.

Next, a method of determining whether the aspheric amount is a positive value or a negative value from lens data on publicly known patent documents or an actual lens and a method of specifically calculating the aspheric amount will be described. In order to determine the positive or negative of the aspheric amount and calculate the aspheric amount, it is necessary to first obtain the radius (curvature radius) of the reference spherical surface. Moreover, in order to obtain the radius of the reference spherical surface, it is necessary to obtain the effective diameter thereof.

There is a case where the effective diameter is not described in the lens data of the patent document. In this case, a simplest method of obtaining the effective diameter is to obtain it by calculating a drawing magnification from an actually measured total length of a zoom lens drawn in a lens sectional view and a known total length of the zoom lens indicated by numerical data, and then by multiplying an actually measured diameter of a drawn curved surface by the drawing magnification. Although the diameter of the drawn curved surface of the lens drawing is set, depending on an optical tool, slightly larger than an actual effective diameter, this method is sufficient in order to determine whether the aspheric amount is positive or negative and to calculate an approximate aspheric amount.

On the other hand, in order to obtain a more accurate effective diameter, a method of calculating it from a marginal contact portion or a lens having a biconvex lens shape of the first lens unit having a negative refractive power.

In the first lens unit having a negative refractive power in an image capturing lens having a wide angle of view, as a distance between successively arranged negative lenses is decreased, it becomes easier to miniaturize the entire zoom lens and to correct field curvature. Hence, most image capturing lenses having a wide angle of view include paired negative lenses having such a marginal contact portion where their marginal (peripheral) portion make contact with each other.

Moreover, decreasing thickness of a marginal portion of the biconvex lens as much as possible generally facilitates miniaturization of the entire zoom lens and correction of field curvature. Therefore, performing ray tracing on all lens surfaces of the first lens unit on an assumption that points where two lens surfaces intersect each other are located on an effective diameter enables deciding a most-marginal ray at any one point on the assumed effective diameter of each lens surface, and a height of the most-marginal ray at each lens surface is decided to be the effective diameter.

Next, a method of obtaining the effective diameter from the actual lens will be described. A simplest method of obtaining the effective diameter is to measure a diameter of a polished surface portion of the lens. In each of most lenses, a margin amount from its effective diameter to an outermost peripheral diameter of the polished surface portion is reduced as much as possible in order to reduce its weight. Hence, measurement of the diameter of the polished surface portion makes it possible to obtain a roughly accurate effective diameter and thereby makes it sufficiently possible to determine whether the aspheric amount is positive or negative and to obtain an approximate aspheric amount.

A method of obtaining a more accurate effective diameter is to measure an inner diameter of a light-shielding member provided, in most zoom lenses, in the first lens unit having a negative refractive power. In general, when intense light hits an edge of a boundary between the polished surface portion and a roughly scraped surface portion, the light is diffusely reflected at the edge, and thereby ghost light is generated. Hence, in order to prevent unnecessary light to hit the boundary between the polished surface portion and the roughly scraped surface portion, a method of providing the light-shielding member corresponding to the effective diameter to cut the unnecessary light is widely used. Thus, performing ray tracing assuming that such a light-shielding member corresponds to the effective diameter enables deciding a most-marginal ray at any one point on the assumed effective diameter of each lens surface, and a height of the most-marginal ray at each lens surface is decided to be the effective diameter.

Next, a method of obtaining an accurate effective diameter from another aspect will be described. The method is to use a zoom lens in combination with an image pickup apparatus or an image projection apparatus and to gradually insert a light-shielding member at a most-object side surface of the zoom lens from its outer periphery toward its center. In this method, a position of the light-shielding member immediately before vignetting of a captured image or a projected image is started to appear corresponds to the effective diameter at the most-object side surface of the zoom lens. Performing ray tracing from that position makes it possible to obtain the effective diameter in portions of the first lens unit other than the most-object side surface.

Next, description will be made of how the zoom lens of each embodiment having a wide angle of view, a small distortion and a high optical performance is produced. Japanese Patent Laid-Open No. 2005-106878 discloses the above-mentioned wide view angle zoom lens having a four lens unit configuration constituted by the first to fourth lens units respectively having negative, positive, positive and negative refractive powers. This zoom lens provides two aspheric lenses to the first lens unit having the negative refractive power so as to reduce distortion while achieving miniaturization of the entire zoom lens and a wide angle of view, but generates significantly large astigmatism and coma aberration.

In order to achieve miniaturization of the wide view angle zoom lens, it is necessary to increase the negative refractive power of the first lens unit, which results in generation of a large barrel-shaped distortion (negative distortion). Hence, many wide view angle zoom lenses provide an aspheric lens having a positive aspheric amount to the first lens unit on which an off-axis principal ray impinges at a high incident height ha so as to correct the barrel-shaped distortion while increasing the angle of view.

The zoom lens disclosed in Japanese Patent Laid-Open No. 2005-106878 also provides two aspheric lenses each having a positive aspheric amount to the first lens unit having a negative refractive power to effectively correct the distortion. However, a positive aspheric effect of the aspheric lenses increases astigmatism in a peripheral image area, which cannot provide a sufficient peripheral optical performance.

Japanese Patent Laid-Open No. 2008-046208 discloses the above-mentioned wide view angle zoom lens having a four lens unit configuration constituted by the first to fourth lens units respectively having negative, positive, negative and positive refractive powers. This zoom lens provides two aspheric lenses to the first lens unit having the negative refractive power so as to achieve a high optical performance while miniaturizing the entire zoom lens and increasing the angle of view, but does not sufficiently correct distortion. This zoom lens provides a first aspheric lens having a positive aspheric amount as a most-object side lens on which an off-axis principal ray impinges at a high incident height ha to correct the distortion and provides a second aspheric lens having a negative aspheric amount as a second object side lens to correct astigmatism generated by the first aspheric lens.

However, the first aspheric lens having the positive aspheric amount and the second aspheric lens having the negative aspheric amount cancel out each other in their effects.

Japanese Patent Laid-Open No. 2008-233284 discloses the above-mentioned wide view angle zoom lens having a two lens unit configuration constituted by the first and second lens units respectively having negative and positive refractive powers. This zoom lens provides two aspheric lenses to the first lens unit having the negative refractive power so as to achieve a high optical performance while increasing the angle of view, but is large in size and does not sufficiently correct distortion.

This zoom lens provides a first aspheric lens having a positive aspheric amount as a second object side lens on which an off-axis principal ray impinges at a relatively high incident height ha to correct the distortion and provides a second aspheric lens having a negative aspheric amount as a third object side lens to correct astigmatism generated by the first aspheric lens. However, the first aspheric lens having the positive aspheric amount and the second aspheric lens having the negative aspheric amount cancel out each other in their effects, which does not necessarily enable providing a sufficient distortion correction effect.

The single focus and wide view angle lens disclosed in US2011/0109974 uses in its second lens unit an aspheric surface whose tilt angle in its peripheral portion is significantly large and thereby whose positive aspheric amount is large so as to increase the angle of view and reduce distortion. If zooming is performed in such a wide view angle lens, change of an incident height ha of an off-axis principal ray in the first lens unit largely changes the aspheric amount at each incident height of the off-axis principal ray, which significantly changes a relationship between distortion and astigmatism. Hence, the lens disclosed in US2011/0109974 is difficult to be applied to a wide view angle zoom lens.

The zoom lens of each embodiment of the present invention includes an image side aspheric lens An having a negative aspheric amount to correct astigmatism, and one or more object side aspheric lenses each having a positive aspheric amount on the object side further than the image side aspheric lens An. The inventor of the present invention found that appropriate setting of a total sum of one or more positive aspheric amounts of the one or more object side aspheric lenses enables sufficient correction of distortion and astigmatism. Moreover, the inventor found that, since in a negative lead zoom lens like the zoom lens of each embodiment the incident height ha of the off-axis principal ray in the first lens unit L1 becomes lower during zooming from the wide-angle end to the telephoto end, a distortion correcting effect provided by the object side aspheric lens and an astigmatism correcting effect provided by the image side aspheric lens are both decreased, and thereby the distortion and the astigmatism are corrected with a good balance.

Specifically, the zoom lens of each embodiment employs the following configuration to achieve a high optical performance with little distortion in the entire zoom range while providing a wide angle of view exceeding 100° at the wide-angle end and a zoom ratio exceeding 1.5 times.

The zoom lens of each embodiment includes, as described above, the first lens unit L1 having a negative refractive power and the rear lens group LR including one or more lens units and having as a whole a positive refractive power. During zooming from the wide-angle end to the telephoto end, the first and rear lens group L1 and LR are moved such that the distance therebetween decreases.

The zoom lens of each embodiment is a negative lead zoom lens having a wide angle of view. A positive lead zoom lens is advantageous in increasing a zoom ratio, but is not suitable for an angle of view wider than 100° at a wide-angle end since a most-object side lens unit having a positive refractive power converges an off-axis light flux.

Moreover, in the zoom lens of each embodiment, the first lens unit L1 includes the image side aspheric lens An having a negative aspheric amount to effectively correct astigmatism generated at a peripheral image height. A negative paraxial power provided by the first lens unit L1 and an aspheric component of the image side aspheric lens An generate a barrel-shaped (negative) distortion. Therefore, in order to correct the negative distortion, the first lens unit L1 includes, on the object side further than the image side aspheric lens An where the incident height ha of the off-axis principal ray is high, one or more object side aspheric lenses whose each aspheric amount satisfies the following condition (1).

When $Aspi$ represents an aspheric amount of an i-th object side aspheric lens, counted from the object side, among the one or more object side aspheric lenses disposed on the object side further than the image side aspheric lens An, $Ndi$ represents a refractive index of a material of the i-th object side aspheric lens, $BLD1$ represents a block length of the first lens unit L1, and $\Sigma$ represents summation for the i-th object side aspheric lens, the following condition is satisfied:

$$0.060 < \Sigma Aspi \times Ndi / BLD1 < 0.200. \quad (1)$$

The block length in this description is a length from a most-object side lens surface to a most-image side lens surface of the first lens unit L1. The aspheric amount $Aspi$ of the i-th aspheric lens is a sum total of an object side aspheric amount and an image side aspheric amount of the i-th object side aspheric lens.

Condition (1) limits a sum total of the aspheric amounts of all the object side aspheric lenses (or the aspheric amount of one object side aspheric lens) disposed on the object side further than the image side aspheric lens An having a negative aspheric amount. A lower value of $\Sigma Aspi \times Ndi / BLD1$ than the lower limit of condition (1) makes the positive aspheric amount insufficient, which makes it difficult to sufficiently correct the distortion. On the other side, a higher value of $\Sigma Aspi \times Ndi / BLD1$ than the upper limit of condition (1) makes the positive aspheric amount excessive, which results in excessive variation of a positive aspheric effect of the object side aspheric lens when the incident height ha of the off-axis principal ray is changed due to zooming. Thereby, it becomes difficult to obtain a satisfactory optical performance in the entire zoom range. It is desirable to set the numerical range of condition (1) as follows:

$$0.070 < \Sigma Aspi \times Ndi / BLD1 < 0.150. \quad (1a)$$

The above-described setting facilitates providing a wide view angle zoom lens having a total angle of view exceeding 100° at the wide-angle end and a zoom ratio exceeding 1.5 times and reducing the distortion in the entire zoom range.

Next, description will be made of conditions for providing more desirable effects. In the following conditions, $An1$ and $An2$ respectively represent aspheric amounts of an object side lens surface and an image side lens surface of the image side aspheric lens An, $En1$ and $En2$ respectively represent effective diameters of the object side lens surface and the image side lens surface of the image side aspheric lens An, and $Ndn$ represents a refractive index of a material of the image side aspheric lens An. Moreover, $Di$ represents a distance between surface apexes of the i-th object side aspheric lens and the image-side aspheric lens An. $Ar1$ and $Ar2$ respectively represent aspheric amounts of an object side lens surface and an image side lens surface of the 1st (first) object side aspheric lens, $Er1$ and $Er2$ respectively represent effective diameters of the object side lens surface and the image side lens surface of the 1st object side aspheric lens, and $Ndr$ represents a refractive index of a material of the 1st object side aspheric lens.

Furthermore, $Rn2$ represents, when an image side lens surface of the image side aspheric lens An is a spherical surface or an aspheric surface, a curvature radius of the spherical surface or of a reference spherical surface of the aspheric surface. $Rr1$ represents, when the object side lens surface of the 1st object side lens is a spherical surface or an aspheric surface, a curvature radius of the spherical surface or of a reference spherical surface of the aspheric surface. In addition, $f1$ represents a focal length of the first lens unit L1, and $fw$ represents a focal length of the entire zoom lens at the wide-angle end. A sigma character $\Sigma$ represents summation of parameter values.

In each embodiment, it is desirable to satisfy at least one of the following conditions:

$$-0.080 < (An1/En1 + An2/En2) \times Ndn < -0.002. \quad (2)$$

$$0.20 < \{\Sigma(Di \times Aspi)/\Sigma Aspi\}/BLD1 < 0.80. \quad (3)$$

$$0.010 < (Ar1/Er1 + Ar2/Er2) \times Ndr < 0.150. \quad (4)$$

$$0.3 < Rn2/BLD1 < 0.8. \quad (5)$$

$$0.50 < Rr1/BLD1 < 2.50. \quad (6)$$

$$1.0 < -f1/fw < 2.5. \quad (7)$$

Technical meaning of each of the above conditions will be described.

Condition (2) limits the aspheric amount of the image side aspheric lens An having a negative aspheric amount. A higher value of $(An1/En1 + An2/En2) \times Ndn$ than the upper limit of condition (2) makes the negative aspheric amount excessively small, which makes it difficult to correct the astigmatism. A lower value of $(An1/En1 + An2/En2) \times Ndn$ than the lower limit of condition (2) makes the negative aspheric amount excessively large, which increases the barrel-shaped distortion (negative distortion). Furthermore, change of the incident height ha of the off-axis principal ray due to zooming largely changes a negative aspheric effect of the image side aspheric lens An, which makes it difficult to provide a high optical performance in the entire zoom range.

It is more desirable to set the numerical range of condition (2) as follows:

$$-0.050 < (An1/En1 + An2/En2) \times Ndn < -0.003. \quad (2a)$$

Condition (3) limits a value obtained by weighting averaging, with the aspheric amount Aspi, the distance from the image side aspheric lens An having a negative aspheric amount to the i-th object side aspheric lens having a positive aspheric amount. This condition (3) means that, as the value of $\{\Sigma(Di \times Aspi)/\Sigma Aspi\}/BLD1$ increases, a position where the positive aspheric effect is provided becomes further away from the aspheric surface having a negative aspheric amount toward the object side. A lower value of $\{\Sigma(Di \times Aspi)/\Sigma Aspi\}/BLD1$ than the lower limit of condition (3) makes the position where the positive aspheric effect is provided close to the image side aspheric lens An, which makes the positive aspheric effect small relative to the negative aspheric effect and thereby makes it difficult to correct the distortion. On the other hand, a higher value of $\{\Sigma(Di \times Aspi)/\Sigma Aspi\}/BLD1$ than the upper limit of condition (3) makes the negative aspheric effect small relative to the positive aspheric effect and thereby makes it difficult to correct the astigmatism.

It is more desirable to set the numerical range of condition (3) as follows.

$$0.25 < \{\Sigma(Di \times Aspi)/\Sigma Aspi\}/BLD1 < 0.60. \tag{3a}$$

Condition (4) limits, when a positive aspheric effect is provided to a most-object side lens (that is, the 1st object side aspheric lens) capable of effectively correcting the distortion because of a high incident height ha of the off-axis principal ray thereto, an aspheric amount of the 1st object side aspheric lens. A higher value of $(Ar1/Er1+Ar2/Er2) \times Ndr$ than the upper limit of condition (4) makes the positive aspheric amount excessively large, which makes difficult to correct the distortion and the astigmatism with a good balance when the incident height ha of the off-axis principal ray is changed with zooming and thereby makes it difficult to provide a high optical performance in the entire zoom range. A lower value of $(Ar1/Er1+Ar2/Er2) \times Ndr$ than the lower limit of condition (4) makes the aspheric amount of the most-object side lens capable of effectively correcting the distortion, which makes the correction of the distortion inefficient.

It is more desirable to set the numerical range of condition (4) as follows.

$$0.025 < (Ar1/Er1+Ar2/Er2) \times Ndr < 0.100. \tag{4a}$$

In the zoom lens of each embodiment, it is desirable that the image side aspheric lens An having a negative aspheric amount be a negative lens whose image side lens surface has a concave shape. This image side aspheric lens An provides a diverging power by its paraxial component and facilitates effective correction of the astigmatism. Specifically, it is desirable to satisfy condition (5). Condition (5) limits, when the image side lens surface of the image side aspheric lens An having a negative aspheric amount is a spherical surface or an aspheric surface, a curvature radius of the spherical surface or of a reference spherical surface of the aspheric surface. A higher value of $Rn2/BLD1$ than the upper limit of condition (5) makes the diverging power of the image side lens surface weak, which makes it difficult to increase the angle of view and correct the astigmatism. A lower value of $Rn2/BLD1$ than the lower limit of condition (5) makes the diverging power of the image side lens surface excessively strong, which increases the distortion.

It is more desirable to set the numerical range of condition (5) as follows:

$$0.35 < Rn2/BLD1 < 0.65. \tag{5a}$$

Condition (6) limits, when a most-object side lens surface (that is, an object side surface of a most-object side spherical lens or the object side lens surface of the 1st object side aspheric lens) is a spherical surface or an aspheric surface, a curvature radius of the spherical surface or of a reference spherical surface of the aspheric surface. This condition (6) is provided in order to cause, at the most-object side lens surface, off-axis rays to pass in a direction of a normal line to the lens surface as much as possible to suppress the barrel-shaped distortion as small as possible. A higher value of $Rr1/BLD1$ than the upper limit of condition (6) makes a curvature of the most-object side lens surface excessively small, which increases its diverging refractive power. As a result, the barrel-shaped distortion is increased, which makes it difficult to correct the distortion by the aspheric surface having a positive aspheric amount. A lower value of $Rr1/BLD1$ than the lower limit of condition (6) makes the curvature of the most-object side lens surface excessively large, which makes it difficult to form the lens surface.

It is more desirable to set the numerical range of condition (6) as follows:

$$0.70 < Rr1/BLD1 < 1.80. \tag{6a}$$

Condition (7) is provided in order to appropriately set the negative refractive power of the first lens unit L1 and thereby to miniaturize the entire zoom lens and to reduce the distortion. A higher value of $-f1/fw$ than the upper limit of condition (7) makes the negative refractive power of the first lens unit L1 excessively weak, which increases the size of the entire zoom lens. A lower value of $-f1/fw$ than the lower limit of condition (7) makes the negative refractive power of the first lens unit L1 excessively strong, which increases the barrel-shaped distortion. It is more desirable to set the numerical range of condition (7) as follows:

$$1.40 < -f1/fw < 2.00. \tag{7a}$$

It is more desirable that the zoom lens of each embodiment include two or more aspheric lenses (object side aspheric lenses) each having a positive aspheric surface on the object side further than the image side aspheric lens An having a negative aspheric amount. Providing such two or more object side aspheric lenses enables distributing the positive aspheric amount to the respective aspheric lens surfaces thereof while providing a sufficient positive aspheric effect as a whole, which facilitates reduction of variation of the positive aspheric effect when the incident height ha of the off-axis principal ray is changed with zooming.

In the zoom lens of each Embodiment, it is desirable that the first lens unit L1 include, from its most-object side toward the image side, successively arranged three negative lenses each having a meniscus shape. Such a negative meniscus lens located on the object side provides a large difference between the incident heights ha of the off-axis principal ray on its object side lens surface and its image side lens surface, which enables providing a diverging power by the image side concave lens surface where the incident height ha is low and facilitates effective correction of the distortion by the object side convex lens surface where the incident height ha is high.

Furthermore, successively providing the three negative meniscus lenses from the most-object side toward the image side enables distributing the diverging power in the first lens unit L1, which facilitates increasing the angle of view while suppressing generation of the barrel-shaped distortion. The lens unit in each embodiment corresponds to a block from the most-object side (frontmost) lens surface or a lens surface whose distance from a lens located on the object side adjacently thereto is changed during zooming, to a most-image side (rearmost) lens surface or a lens surface whose distance from a lens located on the image side adjacently thereto is changed during zooming.

Next, a detailed lens configuration of the zoom lens of each embodiment will be described.

The zoom lens of Embodiment 1 includes, in order from the object side to the image side, the first lens unit L1 having a negative refractive power, the second lens unit L2 having a positive refractive power and the third lens unit L3 having a positive refractive power. The zoom lens of Embodiment 1 is a three lens unit zoom lens having a total angle of view of 125° at the wide-angle end and a zoom ratio of 2.1. During zooming from the wide-angle end to the telephoto end, the first, second and third lens units L1 to L3 are moved so that the distance between the first and second lens units L1 and L2 decreases and the distance between the second and third lens units L2 and L3 increases.

The second lens unit L2 is moved to the image side to perform focusing on from the infinite object to the close distance object.

The first lens unit L1 includes, in order from the object side to the image side, three negative meniscus lenses, two negative biconcave lenses and a positive biconvex lens. Such a configuration of the first lens unit L1 distributes a diverging power (negative refractive power) to the multiple negative lenses, which achieves a wide angle of view without significantly generating the barrel-shaped distortion (negative distortion).

In particular, the three negative meniscus lenses disposed on the object side each have a shape that provides a strong diverging power by its image side lens surface where the incident height ha of the of the off-axis principal ray is low and that suppresses generation of the barrel-shaped distortion by its object side lens surface where the incident height ha is high.

The third object side negative meniscus lens (which is the negative meniscus lens counted from the object side) is the image side aspheric lens An whose image side lens surface has a negative aspheric amount and which mainly corrects the astigmatism. The image side aspheric lens An has a shape whose image side lens surface is a concave surface toward the image side and satisfies condition (5) in order to effectively correct the astigmatism while providing the diverging power. Moreover, the image side aspheric lens An also satisfies condition (2), that is, has an aspheric amount that enables effectively correcting the astigmatism and that prevents an excessive variation of its aspheric effect during zooming.

The most-object side negative meniscus lens is the 1st object side aspheric lens Ap1 having a positive aspheric amount, and the second object side negative meniscus lens is the 2nd object side aspheric lens Ap2 having a positive aspheric amount. The aspheric amounts and refractive indices of the 1st and 2nd object side aspheric lenses Ap1 and Ap2 satisfying condition (1) enable effective correction of the distortion.

Furthermore, the distance on the optical axis from the 1st object side aspheric lens Ap1 to the image side aspheric lens An and the distance thereon from the 2nd object side aspheric lens Ap2 to the image side aspheric lens An satisfy condition (3). Thus, the 1st and 2nd object side aspheric lenses Ap1 and Ap2 enable effectively correcting the distortion and the astigmatism, which reduces the distortion to achieve a high optical performance while increasing the angle of view. The 1st object side aspheric lens Ap1 also satisfies condition (4) to have an aspheric amount that enables effectively correcting the distortion by the most-object side lens and that suppresses a significant variation of its aspheric effect during zooming.

The object side lens surface of the 1st object side aspheric lens Ap1 satisfies condition (6) in order to cause the off-axis rays to pass therethrough in the direction of the normal line to this lens surface and thereby to suppress generation of the distortion by its paraxial component. Moreover, the power of the first lens unit L1 satisfies condition (7), which miniaturizes the entire zoom lens and reduces the distortion.

The zoom lens of Embodiment 2 includes, in order from the object side to the image side, the first lens unit L1 having a negative refractive power and the second lens unit L2 having a positive refractive power. The zoom lens of Embodiment 2 is a two lens unit zoom lens having a total angle of view of 125° at the wide-angle end and a zoom ratio of 2.1. During zooming from the wide-angle end to the telephoto end, the first and second lens units L1 and L2 are moved so that the distance therebetween decreases. The positive refractive index portion L2F of the second lens unit L2 is moved to the image side to perform focusing on from the infinite object to the close distance object.

The first lens unit L1 includes, in order from the object side to the image side, three negative meniscus lenses, two negative biconcave lenses and a positive biconvex lens. The third object side negative meniscus lens is the image side aspheric lens An whose image side lens surface has a negative aspheric amount. The most-object side negative meniscus lens is the 1st object side aspheric lens Ap1 whose object and image side lens surfaces each have a positive aspheric amount, and the second object side negative meniscus lens is the 2nd object side aspheric lens Ap2 whose image side lens surface has a positive aspheric amount. Functions of each lens unit and each aspheric lens are same as those in Embodiment 1.

The zoom lens of Embodiment 1 includes, in order from the object side to the image side, the first lens unit L1 having a negative refractive power, the second lens unit L2 having a positive refractive power, the third lens unit L3 having a positive refractive power and the fourth lens unit L4 having a negative refractive power. The zoom lens of Embodiment 3 is a four lens unit zoom lens having a total angle of view of 125° at the wide-angle end and a zoom ratio of 2.1. During zooming from the wide-angle end to the telephoto end, the first, second, third and fourth lens units L1 to L4 are moved so that the distance between the first and second lens units L1 and L2 decreases, the distance between the second and third lens units L2 and L3 decreases and the distance between the third and fourth lens units L3 and L4 increases.

The second lens unit L2 is moved to the image side to perform focusing on from the infinite object to the close distance object.

The first lens unit L1 includes, in order from the object side to the image side, three negative meniscus lenses, two negative biconcave lenses and a positive biconvex lens. The third object side negative meniscus lens is the image side aspheric lens An whose image side lens surface has a negative aspheric amount. The most-object side negative meniscus lens is the 1st object side aspheric lens Ap1 whose object side lens surface has a positive aspheric amount, and the second object side negative meniscus lens is the 2nd object side aspheric lens Ap2 whose image side lens surface has a positive aspheric amount. Functions of each lens unit and each aspheric lens are same as those in Embodiment 1.

The zoom lenses of Embodiments 4 and 5 each have a same lens configuration, such as a zoom type, a lens unit configuration, optical effects of aspheric lenses, a total angle of view at the wide-angle end and a zoom ratio, as that of Embodiment 1.

The zoom lenses of Embodiments 6 and 7 each have a lens configuration partially different from that of Embodiment 1, but each provide similar effects described in Embodiment 1.

The zoom lens of Embodiment 6 includes, in order from the object side to the image side, the first lens unit L1 having a negative refractive power, the second lens unit L2 having a positive refractive power and the third lens unit L3 having a positive refractive power. The zoom lens of Embodiment 6 is a three lens unit zoom lens having a total angle of view of 123° at the wide-angle end and a zoom ratio of 2.0. During zooming from the wide-angle end to the telephoto end, the first, second and third lens units L1 to L3 are moved so that the distance between the first and second lens units L1 and L2 decreases and the distance between the second and third lens units L2 and L3 increases. The second lens unit L2 is moved to the image side to perform focusing on from the infinite object to the close distance object.

The first lens unit L1 includes, in order from the object side to the image side, two negative meniscus lenses, two negative biconcave lenses and a positive biconvex lens. The second object side negative meniscus lens is the image side aspheric lens An whose image side lens surface has a negative aspheric amount The most-object side negative meniscus lens is the 1st object side aspheric lens Ap1 whose object side lens surface has a positive aspheric amount. The zoom lens of Embodiment 6 includes the one object side aspheric lens Ap1 having a positive aspheric amount on the object side further than the image side aspheric lens An. Moreover, the zoom lens of Embodiment 6 includes only the two negative meniscus lenses successively arranged from the object side. Functions of each lens unit and each aspheric lens are same as those in Embodiment 1 except that the number of the object side aspheric lenses having a positive aspheric amount is one.

The zoom lens of Embodiment 7 includes, in order from the object side to the image side, the first lens unit L1 having a negative refractive power, the second lens unit L2 having a positive refractive power and the third lens unit L3 having a positive refractive power. The zoom lens of Embodiment 7 is a three lens unit zoom lens having a total angle of view of 125° at the wide-angle end and a zoom ratio of 2.1. During zooming from the wide-angle end to the telephoto end, the first, second and third lens units L1 to L3 are moved so that the distance between the first and second lens units L1 and L2 decreases and the distance between the second and third lens units L2 and L3 increases. The second lens unit L2 is moved to the image side to perform focusing on from the infinite object to the close distance object.

The first lens unit L1 includes, in order from the object side to the image side, three negative meniscus lenses, two negative biconcave lenses and a positive biconvex lens. The third object side negative meniscus lens is the image side aspheric lens An whose image side lens surface has a negative aspheric amount. The second object side negative meniscus lens is the 1st object side aspheric lens Ap1 whose object side and image side lens surfaces each have a positive aspheric amount. In Embodiment 7, the most-object side lens is constituted by a lens whose object side and image side lens surfaces are spherical surfaces. Functions of each lens unit and each aspheric lens are same as those in Embodiment 1.

Next, Numerical Examples 1 to 7 respectively corresponding to Embodiments 1 to 7 are shown. In each numerical example, i (i=1, 2, 3, ...) represents a surface number counted from the object side, ri represents a curvature radius of an i-th surface (lens surface), and di represents a distance (lens thickness of aerial distance) between the i-th surface and an (i+1)-th surface. Moreover, ndi and vdi respectively represent a refractive index and an Abbe number of a material of an i-th lens for a d-line, and an effective diameter of the i-th surface is shown. BF represents a back focus corresponding to a distance from the rearmost lens surface to the image plane. A total lens length corresponds to a distance from the first lens surface (most-object side lens surface) to the image plane.

When the lens surface has an aspheric shape, which is shown by "*" added to the surface number, the aspheric shape is expressed by the following expression where X represents a position (coordinate) in a direction in which the optical axis extends (hereinafter referred to as "an optical axis direction), H represents a position (coordinate) in a direction orthogonal to the optical axis, a direction in which light proceeds is defined as a positive direction, R represents a paraxial curvature radius, K represents a conic constant, and A4, A6, A8, A10, A12 and A14 represent aspheric coefficients:

$$X = \frac{(1/R)H^2}{1+\sqrt{1-(1+K)(H/R)^2}} + A4 \times H^4 + A6 \times H^6 + A8 \times H^8 + A10 \times H^{10} + A12 \times H^{12} + A14 \times H^{14}$$

In addition, "e±M" represents "$\times 10^{\pm M}$".

A distance di shown by "variable" is a distance changing with zooming, and the distance corresponding to each of the wide-angle end, a middle zoom position and the telephoto end is shown in an appendix.

Moreover, an effective diameter, which is shown by "variable", of each of an r23 surface in Numerical Examples 1, 2, 4, 5 and 7, an r22 surface in Numerical Example 3 and an r21 surface in Numerical Example 6 is a variable aperture that is changed with zooming. The variable effective diameter corresponding to each of the wide-angle end, the middle zoom position and the telephoto end is shown in another appendix with a surface number "eai".

Table 1 shows values in Numerical Examples (abbreviated as NE) 1 to 7 corresponding to the parameters in the above-described conditions and values of the above-described conditions in Numerical Examples 1 to 7. In Table 1, As1 and As2 respectively represent aspheric amounts of the object side and image side lens surfaces of the 2nd object side aspheric lens Ap2. Es1 and Es2 respectively represent effective diameters of the object side and image side lens surfaces of the 2nd object side aspheric lens Ap2. Nds represents a refractive index of a material of the 2nd object side aspheric lens Ap2. Asp2 represents an aspheric amount of the 2nd object side aspheric lens Ap2.

Numerical Example 1

| Unit mm | | | | | |
|---|---|---|---|---|---|
| Surface Data | | | | | |
| Surface No. | r | d | nd | vd | Effective Diameter |
| 1* | 115.945 | 3.50 | 1.77250 | 49.6 | 84.00 |
| 2 | 32.057 | 6.64 | | | 60.74 |
| 3 | 37.090 | 3.50 | 1.58313 | 59.4 | 60.11 |
| 4* | 22.220 | 11.12 | | | 51.44 |
| 5 | 84.608 | 2.80 | 1.85400 | 40.4 | 50.36 |
| 6* | 34.842 | 9.29 | | | 37.87 |
| 7 | −140.769 | 2.00 | 1.59522 | 67.7 | 37.63 |
| 8 | 31.935 | 5.29 | | | 33.27 |
| 9 | −334.424 | 1.70 | 1.59522 | 67.7 | 33.24 |
| 10 | 53.829 | 2.33 | | | 32.88 |
| 11 | 47.178 | 6.44 | 1.83400 | 37.2 | 33.64 |
| 12 | −103.326 | (Variable) | | | 33.23 |
| 13(SP) | ∞ | 0.50 | | | 19.16 |

-continued

Unit mm

| | | | | | |
|---|---|---|---|---|---|
| 14 | 23.766 | 1.00 | 1.91082 | 35.3 | 19.95 |
| 15 | 13.687 | 5.72 | 1.63980 | 34.5 | 19.17 |
| 16 | 231.365 | (Variable) | | | 19.10 |
| 17 | 68.274 | 4.52 | 1.54814 | 45.8 | 19.12 |
| 18 | −25.113 | 0.15 | | | 18.93 |
| 19 | −28.520 | 0.90 | 1.91082 | 35.3 | 18.63 |
| 20 | 60.759 | 0.15 | | | 18.68 |
| 21 | 24.868 | 3.66 | 1.59551 | 39.2 | 19.10 |
| 22 | 179.295 | 1.50 | | | 18.87 |
| 23 (Variable Aperture) | ∞ | 0.00 | | | (Variable) |
| 24 | 43.910 | 0.90 | 1.83481 | 42.7 | 18.58 |
| 25 | 13.206 | 4.82 | 1.49700 | 81.5 | 17.70 |
| 26 | 69.017 | 0.15 | | | 17.84 |
| 27 | 20.913 | 5.95 | 1.49700 | 81.5 | 18.23 |
| 28 | −22.463 | 0.15 | | | 17.89 |
| 29 | −43.477 | 0.90 | 1.77250 | 49.6 | 17.08 |
| 30 | 14.975 | 6.06 | 1.58313 | 59.4 | 17.67 |
| 31* | −75.778 | | | | 18.81 |

Aspheric Data

1st surface

K = 0.00000e+000        A4 = 6.63370e−006
A6 = −6.87415e−009      A8 = 6.26701e−012
A10 = −3.06214e−015     A12 = 6.75822e−019

4th surface

K = −6.27707e−001       A4 = 8.37327e−006
A6 = −2.71817e−008      A8 = 4.31896e−011
A10 = −9.33146e−014     A12 = 6.05602e−017

6th surface

K = −3.34645e+000       A4 = 1.77375e−005
A6 = −1.69043e−009      A8 = 1.35977e−010
A10 = −5.36943e−013     A12 = 1.00929e−015
A14 = −7.14368e−020

31st surface

K = −3.63687e+000       A4 = 2.15160e−005
A6 = 3.32343e−008       A8 = 4.69301e−011
A10 = 8.60198e−014

Various Data
Zoom Ratio 2.06

| | WIDE | MIDDLE | TELE |
|---|---|---|---|
| Focal Length | 11.30 | 18.00 | 23.30 |
| F-NUMBER | 4.10 | 4.10 | 4.10 |
| Half Angle of View (°) | 62.42 | 50.24 | 42.88 |
| Image Height | 21.64 | 21.64 | 21.64 |
| Total Lens Length | 172.19 | 161.28 | 162.86 |
| BF | 38.82 | 52.31 | 63.15 |
| d12 | 36.75 | 11.35 | 1.50 |
| d16 | 4.49 | 5.49 | 6.08 |
| ea23 | 12.09 | 15.59 | 19.16 |

Lens Unit Data

| Unit | Starting Surface | Focal Length | Block Length | Front Principal Point | Rear Principal Point |
|---|---|---|---|---|---|
| 1 | 1 | −19.53 | 54.60 | 10.16 | −41.88 |
| 2 | 13 | 61.01 | 7.72 | −0.31 | −5.25 |
| 3 | 17 | 76.40 | 29.81 | 10.08 | −10.88 |

Numerical Example 2

Unit mm

Surface Data

| Surface No. | r | d | nd | vd | Effective Diameter |
|---|---|---|---|---|---|
| 1* | 116.802 | 3.50 | 1.77250 | 49.6 | 84.00 |
| 2* | 36.803 | 11.86 | | | 65.04 |
| 3 | 49.848 | 3.50 | 1.49710 | 81.6 | 63.80 |
| 4* | 19.671 | 10.84 | | | 47.70 |
| 5 | 139.022 | 2.80 | 1.85400 | 40.4 | 45.97 |
| 6* | 39.650 | 8.12 | | | 34.54 |
| 7 | −80.871 | 2.00 | 1.59522 | 67.7 | 34.33 |
| 8 | 38.455 | 4.01 | | | 31.39 |
| 9 | −266.681 | 1.70 | 1.59522 | 67.7 | 31.36 |
| 10 | 50.285 | 1.73 | | | 31.37 |
| 11 | 45.349 | 6.40 | 1.88300 | 40.8 | 32.35 |
| 12 | −91.148 | (Variable) | | | 32.07 |
| 13(SP) | ∞ | 0.50 | | | 19.30 |
| 14 | 23.627 | 1.00 | 1.91082 | 35.3 | 19.97 |
| 15 | 13.527 | 5.84 | 1.63980 | 34.5 | 19.18 |
| 16 | 309.605 | 4.10 | | | 19.14 |
| 17 | 70.421 | 4.54 | 1.54814 | 45.8 | 19.15 |
| 18 | −24.805 | 0.23 | | | 18.97 |
| 19 | −26.417 | 0.90 | 1.91082 | 35.3 | 18.69 |
| 20 | 74.786 | 0.15 | | | 18.84 |
| 21 | 26.165 | 4.13 | 1.59551 | 39.2 | 19.30 |
| 22 | −157.269 | 1.50 | | | 19.10 |
| 23 (Variable Aperture) | ∞ | 0.00 | | | (Variable) |
| 24 | 66.212 | 0.90 | 1.83481 | 42.7 | 18.52 |
| 25 | 13.147 | 4.71 | 1.49700 | 81.5 | 17.59 |
| 26 | 59.817 | 0.15 | | | 17.75 |
| 27 | 21.451 | 6.01 | 1.49700 | 81.5 | 18.16 |
| 28 | −21.035 | 0.15 | | | 17.98 |
| 29 | −37.854 | 0.90 | 1.77250 | 49.6 | 17.40 |
| 30 | 14.807 | 6.31 | 1.58313 | 59.4 | 17.77 |
| 31* | −52.985 | | | | 18.71 |

Aspheric Data

1st surface

K = 0.00000e+000        A4 = 8.21883e−006
A6 = −7.76339e−009      A8 = 7.51576e−012
A10 = −3.97942e−015     A12 = 8.79062e−019

2nd surface

K = 0.00000e+000        A4 = 4.60093e−006
A6 = −2.60654e−009      A8 = 9.70241e−012
A10 = −3.87006e−015     A12 = −3.89386e−018

4th surface

K = −8.13124e−001       A4 = 1.29020e−005
A6 = −6.01423e−008      A8 = 5.35167e−011
A10 = −6.62488e−014     A12 = 6.40965e−017

6th surface

K = −3.68713e+000       A4 = 1.69004e−005
A6 = 1.26942e−008       A8 = 2.24261e−010
A10 = −1.06228e−012     A12 = 2.28380e−015
A14 = −7.14368e−020

31st surface

K = 1.32754e+000        A4 = 1.91236e−005
A6 = −2.19431e−009      A8 = 2.90687e−010
A10 = −1.44843e−012

Various Data
Zoom Ratio 2.06

| | WIDE | MIDDLE | TELE |
|---|---|---|---|
| Focal Length | 11.30 | 18.00 | 23.30 |
| F-Number | 4.10 | 4.10 | 4.10 |
| Half Angle of View (°) | 62.42 | 50.24 | 42.88 |

-continued

Unit mm

| | | | |
|---|---|---|---|
| Image Height | 21.64 | 21.64 | 21.64 |
| Total Lens Length | 172.93 | 162.68 | 164.47 |
| BF | 38.82 | 52.87 | 63.99 |
| d12 | 35.63 | 11.32 | 2.00 |
| ea23 | 11.94 | 15.51 | 18.68 |

Lens Unit Data

| Unit | Starting Surface | Focal Length | Block Length | Front Principal Point | Rear Principal Point |
|---|---|---|---|---|---|
| 1 | 1 | −18.76 | 56.47 | 12.73 | −40.06 |
| 2 | 13 | 39.34 | 42.52 | 10.69 | −24.21 |

Numerical Example 3

Unit mm

Surface Data

| Surface No. | r | d | nd | vd | Effective Diameter |
|---|---|---|---|---|---|
| 1* | 154.958 | 3.50 | 1.77250 | 49.6 | 80.01 |
| 2 | 29.515 | 13.26 | | | 55.74 |
| 3 | 59.691 | 3.50 | 1.49710 | 81.6 | 55.12 |
| 4* | 21.978 | 6.87 | | | 43.30 |
| 5 | 104.438 | 2.80 | 1.85400 | 40.4 | 42.65 |
| 6* | 33.401 | 9.18 | | | 33.02 |
| 7 | −52.053 | 2.00 | 1.59522 | 67.7 | 32.89 |
| 8 | 58.197 | 2.63 | | | 31.92 |
| 9 | −633.593 | 1.70 | 1.59522 | 67.7 | 31.94 |
| 10 | 64.481 | 0.15 | | | 32.34 |
| 11 | 47.826 | 6.91 | 1.88300 | 40.8 | 32.92 |
| 12 | −68.507 | (Variable) | | | 32.79 |
| 13(SP) | ∞ | 0.50 | | | 19.08 |
| 14 | 24.007 | 1.00 | 1.91082 | 35.3 | 19.90 |
| 15 | 14.117 | 5.60 | 1.63980 | 34.5 | 19.19 |
| 16 | 291.885 | (Variable) | | | 19.13 |
| 17 | 45.984 | 4.52 | 1.53172 | 48.8 | 19.10 |
| 18 | −29.858 | 0.90 | 1.91082 | 35.3 | 18.80 |
| 19 | 83.230 | 0.15 | | | 18.84 |
| 20 | 31.063 | 4.41 | 1.59551 | 39.2 | 19.10 |
| 21 | −49.772 | 1.00 | | | 18.91 |
| 22 (Variable Aperture) | ∞ | (Variable) | | | (Variable) |
| 23 | −264.017 | 0.90 | 1.83481 | 42.7 | 17.29 |
| 24 | 13.003 | 4.68 | 1.49700 | 81.5 | 16.55 |
| 25 | 123.013 | 0.15 | | | 16.84 |
| 26 | 21.410 | 5.96 | 1.49700 | 81.5 | 17.60 |
| 27 | −19.958 | 0.15 | | | 17.78 |
| 28 | −37.618 | 0.90 | 1.77250 | 49.6 | 17.45 |
| 29 | 14.568 | 6.72 | 1.58313 | 59.4 | 18.14 |
| 30* | −49.967 | | | | 19.37 |

Aspheric Data

1st surface

K = 0.00000e+000     A4 = 7.88342e−006
A6 = −8.06096e−009   A8 = 7.93046e−012
A10 = −4.23301e−015  A12 = 1.01688e−018

4th surface

K = −8.99792e−001    A4 = 2.36970e−006
A6 = −2.99695e−008   A8 = 3.31121e−011
A10 = −9.56668e−014  A12 = 1.00875e−016

6th surface

K = −1.27164e+000    A4 = 2.17641e−005
A6 = −1.16704e−009   A8 = 2.38004e−010
A10 = −1.13731e−012  A12 = 2.73008e−015

-continued

Unit mm

A14 = −7.14368e−020

30th surface

K = 2.15251e+000     A4 = 1.73997e−005
A6 = 2.42187e−008    A8 = 1.49596e−010
A10 = 7.48665e−013

Various Data
Zoom Ratio 2.06

| | WIDE | MIDDLE | TELE |
|---|---|---|---|
| Focal Length | 11.30 | 18.00 | 23.30 |
| F-Number | 4.16 | 4.15 | 4.14 |
| Half Angle of view (°) | 62.42 | 50.24 | 42.87 |
| Image Height | 21.64 | 21.64 | 21.64 |
| Total Lens Length | 170.49 | 158.25 | 158.74 |
| BF | 38.82 | 51.44 | 61.40 |
| d12 | 36.55 | 11.51 | 2.00 |
| d16 | 4.41 | 3.62 | 3.00 |
| d22 | 0.65 | 1.62 | 2.28 |
| ea22 | 11.64 | 15.04 | 17.95 |

Lens Unit Data

| Unit | Starting Surface | Focal Length | Block Length | Front Principal Point | Rear Principal Point |
|---|---|---|---|---|---|
| 1 | 1 | −18.81 | 52.50 | 8.97 | −40.38 |
| 2 | 13 | 58.42 | 7.10 | −0.60 | −4.98 |
| 3 | 17 | 53.70 | 10.98 | 3.77 | −3.81 |
| 4 | 23 | −267.84 | 19.47 | −35.12 | −54.73 |

Numerical Example 4

Unit mm

Surface Data

| Surface No. | r | d | nd | vd | Effective Diameter |
|---|---|---|---|---|---|
| 1* | 130.312 | 3.50 | 1.77250 | 49.6 | 84.00 |
| 2 | 31.800 | 9.06 | | | 60.45 |
| 3 | 40.893 | 3.50 | 1.58313 | 59.4 | 59.92 |
| 4* | 28.341 | 6.81 | | | 52.72 |
| 5* | 44.162 | 2.80 | 1.85400 | 40.4 | 50.20 |
| 6 | 22.356 | 11.81 | | | 37.62 |
| 7 | −151.830 | 2.00 | 1.59522 | 67.7 | 37.19 |
| 8 | 32.259 | 5.59 | | | 33.31 |
| 9 | −269.657 | 1.70 | 1.59522 | 67.7 | 33.26 |
| 10 | 56.161 | 2.13 | | | 33.15 |
| 11 | 47.567 | 6.23 | 1.83400 | 37.2 | 34.12 |
| 12 | −103.398 | (Variable) | | | 33.84 |
| 13(SP) | ∞ | 0.50 | | | 19.33 |
| 14 | 22.995 | 1.00 | 1.91082 | 35.3 | 20.17 |
| 15 | 13.351 | 6.20 | 1.63980 | 34.5 | 19.30 |
| 16 | 180.927 | (Variable) | | | 19.21 |
| 17 | 67.633 | 4.22 | 1.54814 | 45.8 | 19.24 |
| 18 | −25.185 | 0.17 | | | 19.08 |
| 19 | −28.675 | 0.80 | 1.91082 | 35.3 | 18.76 |
| 20 | 60.274 | 0.15 | | | 18.80 |
| 21 | 25.254 | 3.24 | 1.59551 | 39.2 | 19.22 |
| 22 | 167.800 | 1.53 | | | 19.04 |
| 23 (Variable Aperture) | ∞ | 0.02 | | | (Variable) |
| 24 | 40.878 | 0.90 | 1.83481 | 42.7 | 18.76 |
| 25 | 12.912 | 4.54 | 1.49700 | 81.5 | 17.83 |
| 26 | 63.160 | 0.15 | | | 17.95 |
| 27 | 20.391 | 6.57 | 1.49700 | 81.5 | 18.40 |
| 28 | −21.473 | 0.15 | | | 18.00 |
| 29 | −42.995 | 0.90 | 1.77250 | 49.6 | 16.92 |

-continued

Unit mm

| | | | | | |
|---|---|---|---|---|---|
| 30 | 14.919 | 4.87 | 1.58313 | 59.4 | 17.51 |
| 31* | −90.284 | | | | 18.22 |

Aspheric Data

1st surface

K = 0.00000e+000  A4 = 6.94782e−006
A6 = −6.13658e−009  A8 = 5.11232e−012
A10 = −2.37027e−015  A12 = 5.04845e−019

4th surface

K = −3.65317e−001  A4 = 9.64145e−006
A6 = −2.32268e−008  A8 = 4.17146e−011
A10 = −9.66370e−014  A12 = 6.07626e−017

5th surface

K = 1.03867e+000  A4 = −2.01437e−006
A6 = −1.10269e−008  A8 = 2.20578e−011
A10 = −4.71505e−014  A12 = 3.34355e−017
A14 = −6.70766e−021

31st surface

K = −3.63296e+001  A4 = 2.09015e−005
A6 = 3.75425e−008  A8 = 2.56281e−010
A10 = −2.15932e−013

Various Data
Zoom Ratio 2.06

| | WIDE | MIDDLE | TELE |
|---|---|---|---|
| Focal Length | 11.30 | 17.33 | 23.30 |
| F-Number | 4.10 | 4.10 | 4.10 |
| Half Angle of View (°) | 62.42 | 51.30 | 42.88 |
| Image Height | 21.64 | 21.64 | 21.64 |
| Total Lens Length | 170.79 | 160.38 | 161.97 |
| BF | 38.80 | 50.96 | 63.13 |
| d12 | 36.47 | 13.23 | 2.00 |
| d16 | 4.48 | 5.14 | 5.79 |
| ea23 | 12.12 | 15.32 | 18.89 |

Lens Unit Data

| Unit | Starting Surface | Focal Length | Block Length | Front Principal Point | Rear Principal Point |
|---|---|---|---|---|---|
| 1 | 1 | −19.30 | 55.13 | 10.54 | −41.93 |
| 2 | 13 | 60.49 | 7.70 | −1.07 | −5.77 |
| 3 | 17 | 76.92 | 28.21 | 8.46 | −11.22 |

Numerical Example 5

Unit mm

Surface Data

| Surface No. | r | d | nd | vd | Effective Diameter |
|---|---|---|---|---|---|
| 1 | 56.312 | 3.50 | 1.77250 | 49.6 | 89.32 |
| 2* | 38.244 | 4.47 | | | 71.49 |
| 3 | 38.870 | 3.50 | 1.58313 | 59.4 | 68.01 |
| 4* | 15.593 | 16.34 | | | 54.11 |
| 5 | 99.417 | 2.80 | 1.85400 | 40.4 | 52.14 |
| 6* | 42.615 | 7.83 | | | 39.16 |
| 7 | −776.355 | 2.00 | 1.59522 | 67.7 | 38.91 |
| 8 | 28.871 | 7.16 | | | 33.52 |
| 9 | −87.686 | 1.70 | 1.59522 | 67.7 | 33.46 |
| 10 | 42.873 | 1.96 | | | 33.25 |
| 11 | 44.127 | 7.02 | 1.88300 | 40.8 | 34.38 |
| 12 | −95.316 | (Variable) | | | 34.11 |
| 13(SP) | ∞ | 0.50 | | | 19.04 |
| 14 | 23.763 | 1.00 | 1.91082 | 35.3 | 19.81 |
| 15 | 13.492 | 5.71 | 1.63980 | 34.5 | 19.02 |
| 16 | 217.234 | (Variable) | | | 18.97 |
| 17 | 74.209 | 4.53 | 1.54814 | 45.8 | 19.06 |
| 18 | −24.270 | 0.15 | | | 18.90 |
| 19 | −26.867 | 0.90 | 1.91082 | 35.3 | 18.64 |
| 20 | 87.166 | 0.15 | | | 18.77 |
| 21 | 26.548 | 4.05 | 1.59551 | 39.2 | 19.17 |
| 22 | −169.730 | 1.50 | | | 18.93 |
| 23 (Variable Aperture) | ∞ | 0.00 | | | (Variable) |
| 24 | 62.658 | 0.90 | 1.83481 | 42.7 | 18.31 |
| 25 | 12.870 | 4.64 | 1.49700 | 81.5 | 17.36 |
| 26 | 53.585 | 0.15 | | | 17.61 |
| 27 | 21.447 | 6.30 | 1.49700 | 81.5 | 18.43 |
| 28 | −20.357 | 0.15 | | | 18.54 |
| 29 | −32.621 | 0.90 | 1.77250 | 49.6 | 18.20 |
| 30 | 14.904 | 6.72 | 1.58313 | 59.4 | 18.88 |
| 31* | −45.303 | | | | 19.84 |

Aspheric Data

2nd surface

K = 0.00000e+000  A4 = 1.13417e−005
A6 = −1.81623e−008  A8 = 9.88199e−012
A10 = 2.94560e−015  A12 = −4.09193e−018

4th surface

K = −1.20063e+000  A4 = −1.84060e−005
A6 = 6.29694e−008  A8 = 2.25242e−012
A10 = −1.81953e−013  A12 = 1.40860e−016

6th surface

K = −8.75669e−001  A4 = 1.49897e−005
A6 = −5.16486e−008  A8 = 3.27081e−010
A10 = −8.48991e−013  A12 = 1.14217e−015
A14 = −7.25330e−020

31st surface

K = 1.16406e+001  A4 = 2.90717e−005
A6 = 8.11969e−008  A8 = −2.52083e−010
A10 = 3.27569e−012

Various Data
Zoom Ratio 2.06

| | WIDE | MIDDLE | TELE |
|---|---|---|---|
| Focal Length | 11.30 | 18.00 | 23.30 |
| F-NUMBER | 4.10 | 4.10 | 4.10 |
| Half Angle of View (°) | 62.42 | 50.24 | 42.88 |
| Image Height | 21.64 | 21.64 | 21.64 |
| Total Lens Length | 178.05 | 166.01 | 167.37 |
| BF | 38.82 | 52.47 | 63.34 |
| d12 | 38.24 | 12.09 | 2.00 |
| d16 | 4.45 | 4.92 | 5.49 |
| ea23 | 12.01 | 15.45 | 18.48 |

Lens Unit Data

| Unit | Starting Surface | Focal Length | Block Length | Front Principal Point | Rear Principal Point |
|---|---|---|---|---|---|
| 1 | 1 | −19.73 | 58.28 | 13.64 | −42.06 |
| 2 | 13 | 62.70 | 7.21 | −0.91 | −5.33 |
| 3 | 17 | 74.43 | 31.04 | 11.60 | −10.84 |

Numerical Example 6

Unit mm

Surface Data

| Surface No. | r | d | nd | vd | Effective Diameter |
|---|---|---|---|---|---|
| 1* | 188.441 | 3.50 | 1.72000 | 50.2 | 86.00 |
| 2* | 34.503 | 25.00 | | | 64.06 |
| 3 | 221.461 | 2.80 | 1.85400 | 40.4 | 48.01 |
| 4* | 26.189 | 6.37 | | | 35.25 |
| 5 | 133.252 | 2.00 | 1.59522 | 67.7 | 35.07 |
| 6 | 27.948 | 6.65 | | | 31.38 |
| 7 | −75.735 | 1.70 | 1.59522 | 67.7 | 31.33 |
| 8 | 46.632 | 2.18 | | | 31.60 |
| 9 | 47.302 | 6.77 | 1.88300 | 40.8 | 32.89 |
| 10 | −74.588 | (Variable) | | | 32.73 |
| 11(SP) | ∞ | 0.50 | | | 19.51 |
| 12 | 24.601 | 1.00 | 1.91082 | 35.3 | 20.28 |
| 13 | 13.970 | 5.76 | 1.64769 | 33.8 | 19.50 |
| 14 | 229.511 | (Variable) | | | 19.43 |
| 15 | 42.848 | 4.93 | 1.51742 | 52.4 | 19.42 |
| 16 | −26.067 | 0.28 | | | 19.10 |
| 17 | −29.518 | 0.90 | 1.88300 | 40.8 | 18.67 |
| 18 | 75.113 | 0.15 | | | 18.57 |
| 19 | 31.599 | 3.49 | 1.51823 | 58.9 | 18.73 |
| 20 | −601.994 | 1.50 | | | 18.51 |
| 21 (Variable Aperture) | ∞ | 0.00 | | | (Variable) |
| 22 | 68.287 | 0.90 | 1.83481 | 42.7 | 18.12 |
| 23 | 13.730 | 4.52 | 1.49700 | 81.5 | 17.43 |
| 24 | 67.404 | 0.15 | | | 17.85 |
| 25 | 21.859 | 6.35 | 1.49700 | 81.5 | 18.98 |
| 26 | −22.270 | 0.15 | | | 19.25 |
| 27 | −52.813 | 0.90 | 1.77250 | 49.6 | 18.95 |
| 28 | 14.484 | 6.32 | 1.58313 | 59.4 | 19.18 |
| 29* | −78.136 | | | | 19.84 |

Aspheric Data

1st surface

K = 0.00000e+000    A4 = 1.10736e−005
A6 = −1.00765e−008  A8 = 7.30781e−012
A10 = −3.08767e−015  A12 = 6.00371e−019

2nd surface

K = 0.00000e+000    A4 = 8.11195e−006
A6 = 1.14304e−009   A8 = −7.95403e−012
A10 = 1.10372e−014  A12 = −9.76761e−018

4th surface

K = −1.63178e+000   A4 = 1.57587e−005
A6 = −2.60985e−008  A8 = 2.07183e−010
A10 = −5.91105e−013 A12 = 9.30911e−016
A14 = −7.14368e−020

29th surface

K = 1.35957e+001    A4 = 1.95159e−005
A6 = 2.55356e−008   A8 = −1.78625e−010
A10 = 8.89323e−013

Various Data
Zoom Ratio 2.01

| | WIDE | MIDDLE | TELE |
|---|---|---|---|
| Focal Length | 11.60 | 18.00 | 23.30 |
| F-NUMBER | 4.10 | 4.10 | 4.10 |
| Half Angle of View (°) | 61.80 | 50.24 | 42.88 |
| Image Height | 21.64 | 21.64 | 21.64 |
| Total Lens Length | 175.07 | 164.64 | 165.76 |
| BF | 38.82 | 51.65 | 62.51 |
| d10 | 36.86 | 12.29 | 2.00 |
| d14 | 4.61 | 5.92 | 6.48 |
| ea21 | 11.99 | 15.24 | 18.23 |

Lens Unit Data

| Unit | Starting Surface | Focal Length | Block Length | Front Principal Point | Rear Principal Point |
|---|---|---|---|---|---|
| 1 | 1 | −19.93 | 56.98 | 12.04 | −43.95 |
| 2 | 11 | 62.63 | 7.26 | −0.83 | −5.27 |
| 3 | 15 | 78.62 | 30.54 | 9.63 | −12.56 |

Numerical Example 7

Unit mm

Surface Data

| Surface No. | r | d | nd | vd | Effective Diameter |
|---|---|---|---|---|---|
| 1 | 50.681 | 4.00 | 1.77250 | 49.6 | 86.00 |
| 2 | 36.850 | 8.20 | | | 69.36 |
| 3* | 296.216 | 3.50 | 1.63854 | 55.4 | 68.81 |
| 4* | 27.952 | 15.00 | | | 51.18 |
| 5 | 67.743 | 2.80 | 1.85400 | 40.4 | 48.00 |
| 6* | 32.365 | 6.92 | | | 37.68 |
| 7 | 210.781 | 2.00 | 1.59522 | 67.7 | 37.44 |
| 8 | 27.958 | 7.17 | | | 32.57 |
| 9 | −76.958 | 1.70 | 1.59522 | 67.7 | 32.49 |
| 10 | 43.809 | 2.19 | | | 31.94 |
| 11 | 43.352 | 6.77 | 1.80610 | 40.9 | 32.78 |
| 12 | −80.747 | (Variable) | | | 32.52 |
| 13(SP) | ∞ | 0.50 | | | 18.37 |
| 14 | 23.115 | 1.00 | 1.91082 | 35.3 | 19.09 |
| 15 | 13.094 | 5.37 | 1.64769 | 33.8 | 18.32 |
| 16 | 159.005 | (Variable) | | | 18.25 |
| 17 | 58.307 | 4.33 | 1.51742 | 52.4 | 18.33 |
| 18 | −25.006 | 0.15 | | | 18.14 |
| 19 | −29.144 | 0.90 | 1.88300 | 40.8 | 17.86 |
| 20 | 62.805 | 0.15 | | | 17.88 |
| 21 | 26.952 | 3.21 | 1.51823 | 58.9 | 18.17 |
| 22 | 150.682 | 1.50 | | | 18.03 |
| 23 (Variable Aperture) | ∞ | 0.00 | | | (Variable) |
| 24 | 34.410 | 0.90 | 1.83481 | 42.7 | 18.18 |
| 25 | 13.464 | 4.40 | 1.49700 | 81.5 | 17.82 |
| 26 | 49.331 | 0.15 | | | 18.39 |
| 27 | 22.623 | 6.62 | 1.49700 | 81.5 | 19.55 |
| 28 | −20.883 | 0.15 | | | 19.85 |
| 29 | −40.818 | 0.90 | 1.77250 | 49.6 | 19.43 |
| 30 | 18.126 | 5.42 | 1.58313 | 59.4 | 19.73 |
| 31* | −76.581 | | | | 20.23 |

Aspheric Data

3rd surface

K = 0.00000e+000    A4 = 2.00696e−005
A6 = −2.25661e−008  A8 = 2.39068e−011
A10 = −1.67716e−014 A12 = 5.72438e−018

4th surface

K = 0.00000e+000    A4 = 1.04240e−005
A6 = 1.26091e−008   A8 = −1.09712e−011
A10 = −1.47889e−014 A12 = −3.07359e−017

6th surface

K = −1.26449e+000   A4 = 1.50660e−005
A6 = −3.69803e−008  A8 = 2.05459e−010
A10 = −5.32579e−013 A12 = 8.68319e−016
A14 = −7.14368e−020

31st surface

K = −8.45393e+000   A4 = 2.38035e−005

-continued

Unit mm

A6 = 4.87325e−008   A8 = 4.33576e−011
A10 = −2.68747e−013

Various Data
Zoom Ratio 1.99

|  | WIDE | MIDDLE | TELE |
|---|---|---|---|
| Focal Length | 11.70 | 18.00 | 23.30 |
| F-NUMBER | 4.10 | 4.10 | 4.10 |
| Half Angle of View (°) | 61.60 | 50.24 | 42.88 |
| Image Height | 21.64 | 21.64 | 21.64 |
| Total Lens Length | 175.06 | 164.29 | 164.97 |
| BF | 38.82 | 50.81 | 61.07 |
| d12 | 35.99 | 12.19 | 2.00 |
| d16 | 4.36 | 5.40 | 6.01 |
| ea23 | 12.04 | 15.12 | 17.97 |

Lens Unit Data

| Unit | Starting Surface | Focal Length | Block Length | Front Principal Point | Rear Principal Point |
|---|---|---|---|---|---|
| 1 | 1 | −20.41 | 60.24 | 16.44 | −41.42 |
| 2 | 13 | 62.51 | 6.87 | −1.13 | −5.31 |
| 3 | 17 | 71.75 | 28.77 | 10.01 | −10.44 | described in any one of Embodiments 1 to 7 and a camera body 20 to which the interchangeable lens 10 is detachably attached via a camera mount portion provided therein. The zoom lens 1 is housed by a lens barrel 2 as a body of the interchangeable lens 10. The camera body 20 is provided with an image sensor 7 that converts an optical image formed by the zoom lens 1 into an electrical image signal.

The camera body 20 is further provided with a quick return mirror 3 that is disposed in an optical path from the interchangeable lens 10 and reflects a light flux therefrom upward, and a focusing plate 4 on which an object image is formed by the reflected light flux. The quick return mirror 3 is moved outside the optical path when image capturing is performed by the image sensor 7. The camera body 20 is further provided with a penta dach prism 5 that converts an inverse image formed on the focusing plate 4 into an erected image and an eyepiece lens 6 through which a user observes the erected image.

The zoom lens 10 enables the camera body 20 to perform image capturing of an image with a wide angle of view and little aberration in the entire zoom range.

Moreover, the zoom lens described in each of Embodiments 1 to 7 can be used also for image pickup apparatuses other than the above-described single-lens reflex camera, such as a lens-interchangeable camera having no quick return mirror and a lens-integrated camera.

TABLE 1

| Lens Unit Type | NE1 NPP | NE2 NP | NE3 NPPN | NE4 NPP | NE5 NPP | NE6 NPP | NE7 NPP |
|---|---|---|---|---|---|---|---|
| fw | 11.300 | 11.300 | 11.301 | 11.300 | 11.300 | 11.600 | 11.700 |
| ft | 23.299 | 23.300 | 23.303 | 23.300 | 23.296 | 23.299 | 23.301 |
| f1 | −19.526 | −18.758 | −18.815 | −19.305 | −19.726 | −19.930 | −20.408 |
| BLD1 | 54.596 | 56.467 | 52.505 | 55.134 | 58.283 | 56.976 | 60.244 |
| R1 | 54.936 | 51.007 | 55.411 | 55.694 | 56.313 | 53.293 | 50.681 |
| R2 | 26.814 | 27.584 | 24.718 | 22.356 | 29.618 | 24.849 | 27.263 |
| (1) ΣAspi × Ndi/BLD1 | 0.098 | 0.120 | 0.090 | 0.090 | 0.109 | 0.095 | 0.074 |
| (3) (Σ(Di × Aspi)/ΣAspi)/BLD1 | 0.364 | 0.419 | 0.406 | 0.312 | 0.391 | 0.500 | 0.299 |
| (5) Rn2/BLD1 | 0.491 | 0.488 | 0.471 | 0.405 | 0.508 | 0.436 | 0.453 |
| (6) Rr1/BLD1 | 1.006 | 0.903 | 1.055 | 1.010 | 0.966 | 0.935 | 0.841 |
| (7) −f1/fw | 1.728 | 1.660 | 1.665 | 1.708 | 1.746 | 1.718 | 1.744 |
| An |  |  |  |  |  |  |  |
| An1 | 0.000 | 0.000 | 0.000 | −0.516 | 0.000 | 0.000 | 0.000 |
| An2 | −0.506 | −0.554 | −0.410 | 0.000 | −0.661 | −0.113 | −0.333 |
| En1 | 50.357 | 45.974 | 42.646 | 50.200 | 52.143 | 48.007 | 48.002 |
| En2 | 37.866 | 34.540 | 33.019 | 37.616 | 39.165 | 35.252 | 37.681 |
| Ndn | 1.854 | 1.854 | 1.854 | 1.854 | 1.854 | 1.854 | 1.854 |
| Aspn | −0.506 | −0.554 | −0.410 | −0.516 | −0.661 | −0.113 | −0.333 |
| (2) (An1/En1 + An2/En2) × Ndn | −0.025 | −0.030 | −0.023 | −0.019 | −0.031 | −0.006 | −0.016 |
| Ap1 |  |  |  |  |  |  |  |
| Ar1 | 1.637 | 1.513 | 1.828 | 1.609 | 0.000 | 1.648 | 1.702 |
| Ar2 | 0.000 | 0.950 | 0.000 | 0.000 | 1.421 | 1.492 | 1.017 |
| Er1 | 83.997 | 84.004 | 80.007 | 84.004 | 89.325 | 86.003 | 68.806 |
| Er2 | 60.739 | 65.044 | 55.743 | 60.454 | 71.491 | 64.060 | 51.176 |
| Ndr | 1.772 | 1.772 | 1.772 | 1.772 | 1.772 | 1.720 | 1.639 |
| Asp1 | 1.637 | 2.463 | 1.828 | 1.609 | 1.421 | 3.140 | 2.719 |
| D1 | 24.755 | 29.700 | 27.137 | 22.868 | 27.810 | 28.500 | 18.000 |
| (4) (Ar1/Er1 + Ar2/Er2) × Ndr | 0.035 | 0.058 | 0.040 | 0.034 | 0.035 | 0.073 | 0.073 |
| Ap2 |  |  |  |  |  |  |  |
| As1 | 0.000 | 0.000 | 0.000 | 0.000 | 0.000 | — | — |
| As2 | 1.536 | 1.596 | 0.975 | 1.318 | 2.413 | — | — |
| Es1 | 60.110 | 63.800 | 55.124 | 59.920 | 68.008 | — | — |
| Es2 | 51.436 | 47.699 | 43.295 | 52.716 | 54.105 | — | — |
| Nds | 1.583 | 1.497 | 1.497 | 1.583 | 1.583 | — | — |
| Asp2 | 1.536 | 1.596 | 0.975 | 1.318 | 2.413 | — | — |
| D2 | 14.620 | 14.340 | 10.370 | 10.310 | 19.840 | — | — |

Figure 16:
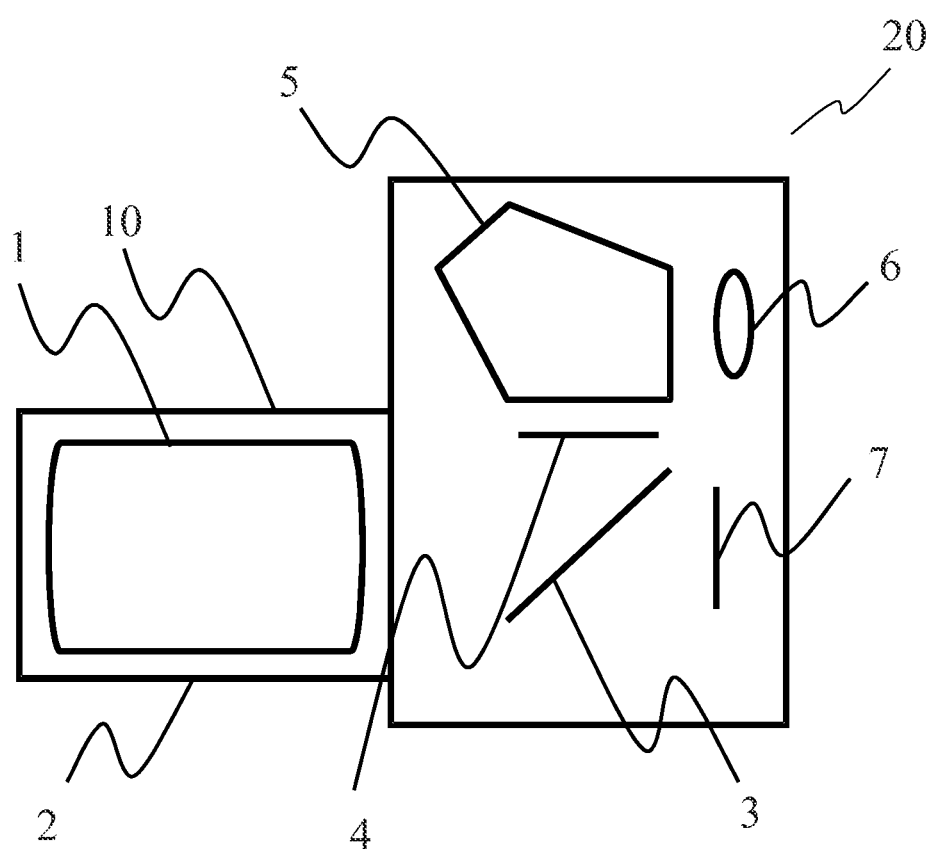
FIG. 16 shows an image pickup apparatus of Embodiment 8 of the present invention.

FIG. 16 shows a single-lens reflex camera (image pickup apparatus) that is an eighth embodiment (Embodiment 8) of the present invention. The image pickup apparatus is constituted by an interchangeable lens 10 including the zoom lens 1

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-244232, filed Nov. 6, 2012, which is hereby incorporated by reference herein in its entirety.

What is claimed is:

1. A zoom lens comprising in order from an object side to an image side:
   a first lens unit having a negative refractive power; and
   a rear lens group including one or more lens units and having as a whole a positive refractive power,
   wherein:
      the first lens unit and the rear lens group are moved during zooming so that a distance between the first lens unit and the rear lens group decreases at a telephoto end as compared with at a wide-angle end,
      the first lens unit includes an image side aspheric lens having a negative aspheric amount and one or more object side aspheric lenses disposed on the object side further than the image side aspheric lens, and
      the following condition is satisfied:

$$0.060 < \Sigma Aspi \times Ndi / BLD1 < 0.200$$

where Aspi represents an aspheric amount of an i-th object side aspheric lens counted from the object side among the one or more object side aspheric lenses, Ndi represents a refractive index of a material of the i-th object side aspheric lens, BLD1 represents a length of the first lens unit from its most-object side lens surface to its most-image side lens surface, and $\Sigma$ represents summation.

2. The zoom lens according to claim 1, wherein the following condition is satisfied:

$$-0.080 < (An1/En1 + An2/En2) \times Ndn < -0.002$$

where An1 and An2 respectively represent aspheric amounts of an object side lens surface and an image side lens surface of the image side aspheric lens, En1 and En2 respectively represent effective diameters of the object side lens surface and the image side lens surface of the image side aspheric lens, and Ndn represents a refractive index of a material of the image side aspheric lens.

3. The zoom lens according to claim 1, wherein the following condition is satisfied:

$$0.20 < \{\Sigma(Di \times Aspi)/\Sigma Aspi\}/BLD1 < 0.80$$

where Di represents a distance between surface apexes of the i-th object side aspheric lens and the image side aspheric lens.

4. The zoom lens according to claim 1, wherein a most object side lens in the first lens unit is an aspheric lens, and wherein the following condition is satisfied:

$$0.010 < (Ar1/Er1 + Ar2/Er2) \times Ndr < 0.150$$

where Ar1 and Ar2 respectively represent aspheric amounts of an object side lens surface and an image side lens surface of the 1st object side aspheric lens, Er1 and Er2 respectively represent effective diameters of the object side lens surface and the image side lens surface of the 1st object side aspheric lens, and Ndr represents a refractive index of a material of the 1st object side aspheric lens.

5. The zoom lens according to claim 1, wherein the following condition is satisfied:

$$0.3 < Rn2/BLD1 < 0.8$$

where Rn2 represents, when an image side lens surface of the image side aspheric lens is a spherical surface or an aspheric surface, a curvature radius of the spherical surface or of a reference spherical surface of the aspheric surface.

6. The zoom lens according to claim 1, wherein the following condition is satisfied:

$$0.50 < Rr1/BLD1 < 2.50$$

where Rr1 represents, when an object side lens surface of a most object side lens in the first lens unit is a spherical surface or an aspheric surface, a curvature radius of the spherical surface or of a reference spherical surface of the aspheric surface.

7. The zoom lens according to claim 1, wherein the first lens unit includes, as the object side aspheric lenses, two aspheric lenses each having a positive aspheric amount.

8. The zoom lens according to claim 1, wherein the first lens unit includes three negative lenses arranged successively from the object side to the image side and each having a meniscus shape.

9. The zoom lens according to claim 1, wherein the following condition is satisfied:

$$1.0 < -f1/fw < 2.5$$

where f1 represents a focal length of the first lens unit, and fw represents a focal length of the entire zoom lens at the wide-angle end.

10. The zoom lens according to claim 1, wherein:
    the rear lens group includes, in order from the object side to the image side, a second lens unit having a positive refractive power, and a third lens unit having a positive refractive power, and
    the second and third lens units are moved to the object side during zooming from the wide-angle end to the telephoto end so that a distance between the second and third lens units increases at the telephoto end as compared with at the wide-angle end.

11. The zoom lens according to claim 1, wherein the rear lens group is constituted by a second lens unit having a positive refractive power.

12. The zoom lens according to claim 1, wherein:
    the rear lens group includes, in order from the object side to the image side, a second lens unit having a positive refractive power, a third lens unit having a positive refractive power, and a fourth lens unit having a negative refractive power, and
    the second, third, and fourth lens units are moved to the object side during zooming from the wide-angle end to the telephoto end so that a distance between the second and third lens units decreases and a distance between the third and fourth lens units increases at the telephoto end as compared with at the wide-angle end.

13. An image pickup apparatus comprising:
    a zoom lens; and
    an image sensor to photoelectrically convert an optical image formed by the zoom lens,
    wherein the zoom lens comprises in order from an object side to an image side:
       a first lens unit having a negative refractive power; and
       a rear lens group including one or more lens units and having as a whole a positive refractive power, and
    wherein:
       the first lens unit and the rear lens group are moved during zooming so that a distance between the first lens unit and the rear lens group decreases at a telephoto end as compared with at a wide-angle end,
       the first lens unit includes an image side aspheric lens having a negative aspheric amount and one or more object side aspheric lenses disposed on the object side further than the image side aspheric lens, and the following condition is satisfied:

$$0.060 < \Sigma Aspi \times Ndi/BLD1 < 0.200$$

where Aspi represents an aspheric amount of an i-th object side aspheric lens counted from the object side among the one or more object side aspheric lenses, Ndi represents a refractive index of a material of the i-th object side aspheric lens, BLD1 represents a length of the first lens unit from its most-object side lens surface to its most-image side lens surface, and $\Sigma$ represents summation.

* * * * *